(12) United States Patent
Yavari et al.

(10) Patent No.: US 10,620,307 B2
(45) Date of Patent: Apr. 14, 2020

(54) SYSTEMS AND METHODS FOR DETECTION OF OCCUPANCY USING RADIO WAVES

(71) Applicant: University of Hawaii, Honolulu, HI (US)

(72) Inventors: Ehsan Yavari, Honolulu, HI (US); Xiaomeng Gao, Honolulu, HI (US); Olga Boric-Lubecke, Honolulu, HI (US); Chenyan Song, Honolulu, HI (US); Pooja Nuti, Honolulu, HI (US); Shuhei Yamada, Honolulu, HI (US)

(73) Assignee: University of Hawaii, Honolulu, HI (US)

( * ) Notice: Subject to any disclaimer, the term of this patent is extended or adjusted under 35 U.S.C. 154(b) by 673 days.

(21) Appl. No.: 15/343,843

(22) Filed: Nov. 4, 2016

(65) Prior Publication Data

US 2017/0123058 A1     May 4, 2017

Related U.S. Application Data

(60) Provisional application No. 62/250,774, filed on Nov. 4, 2015, provisional application No. 62/259,576, filed (Continued)

(51) Int. Cl.
*G01S 13/56* (2006.01)
*G01S 13/86* (2006.01)

(52) U.S. Cl.
CPC .............. *G01S 13/56* (2013.01); *G01S 13/86* (2013.01)

(58) Field of Classification Search
CPC ................................. G01S 13/56; G01S 13/86
(Continued)

(56) References Cited

U.S. PATENT DOCUMENTS 3,134,847 A * 5/1964 Goldstein .............. H01Q 1/084
174/153 A
3,144,631 A * 8/1964 Lustig ................. G01S 15/8902
367/12
(Continued)

FOREIGN PATENT DOCUMENTS

EP         2080036 B1 * 1/2019 .............. G01S 5/00
WO   WO-2012158840 A1 * 11/2012 ............. A61B 5/002
(Continued)

OTHER PUBLICATIONS

Gao, X., et al., "Respiratory Angle of Thoracic Wall Movement During Lung Ventilation," IEEE Sensors Journal, vol. 16, No. 13, Jul. 1, 2016, in 7 pages.
(Continued)

*Primary Examiner* — Vladimir Magloire
*Assistant Examiner* — Nuzhat Pervin
(74) *Attorney, Agent, or Firm* — Knobbe, Martens, Olson & Bear, LLP

(57) ABSTRACT

Systems and methods are disclosed for detecting a presence of a person in an area of coverage using radar. A transmitter can transmit radio signals in a first direction in an area of coverage defined by a wall and a floor. A receiver can receive the transmitted radio signals reflected back from the area of coverage. A signal conditioning circuit can process the received radio signals. One or more hardware processors can be programmed to analyze the processed radio signals and detect a presence of a person in the area of coverage based on the analysis. The analysis of the processed signals can be performed in both time and frequency domain. In addition to radar, an input from an infrared sensor can also be used in conjunction with radar based detection.

17 Claims, 49 Drawing Sheets

Related U.S. Application Data on Nov. 24, 2015, provisional application No. 62/288,389, filed on Jan. 28, 2016, provisional application No. 62/288,361, filed on Jan. 28, 2016, provisional application No. 62/288,383, filed on Jan. 28, 2016, provisional application No. 62/289,287, filed on Jan. 31, 2016.

(58) Field of Classification Search
USPC .......................................................... 342/28
See application file for complete search history.

(56) References Cited

U.S. PATENT DOCUMENTS

| | | | | |
|---|---|---|---|---|
| 4,608,566 | A * | 8/1986 | Ennis | G01S 13/4445 342/149 |
| 4,660,040 | A * | 4/1987 | Grandos | G01S 13/345 342/128 |
| 5,128,683 | A * | 7/1992 | Freedman | G01S 7/032 342/158 |
| 5,151,702 | A * | 9/1992 | Urkowitz | G01S 13/284 342/116 |
| 5,173,706 | A * | 12/1992 | Urkowitz | G01S 7/032 342/101 |
| 5,986,357 | A * | 11/1999 | Myron | G06K 9/00335 307/116 |
| 6,683,557 | B2 * | 1/2004 | Pleva | B60K 31/0008 342/74 |
| 6,816,437 | B1 * | 11/2004 | Teller | G01S 5/186 367/124 |
| 7,154,434 | B1 * | 12/2006 | Sego | G01S 13/48 342/161 |
| 7,548,187 | B1 * | 6/2009 | Laste | G01S 13/5244 342/104 |
| 7,567,200 | B1 * | 7/2009 | Osterweil | A61B 5/1117 342/28 |
| 7,890,060 | B2 * | 2/2011 | Lehtinen | G01S 5/00 455/67.11 |
| 7,916,066 | B1 * | 3/2011 | Osterweil | A61B 5/1117 340/573.1 |
| 8,068,051 | B1 * | 11/2011 | Osterweil | A61B 5/1117 340/573.1 |
| 8,368,586 | B2 * | 2/2013 | Mohamadi | G01S 7/026 342/147 |
| 9,134,398 | B2 * | 9/2015 | Dupray | G01S 1/026 |
| 9,229,102 | B1 * | 1/2016 | Wright | G01S 13/888 |
| 9,711,038 | B1 * | 7/2017 | Pennebaker, III | G08C 17/02 |
| 10,205,457 | B1 * | 2/2019 | Josefsberg | G01S 7/032 |
| 2004/0141056 | A1 * | 7/2004 | Izumi | G08B 13/187 348/143 |
| 2006/0267764 | A1 * | 11/2006 | Morinaga | G01S 13/04 340/545.3 |
| 2007/0103548 | A1 * | 5/2007 | Carter | H04M 11/025 348/143 |
| 2008/0102756 | A1 * | 5/2008 | Lehtinen | G01S 5/00 455/67.11 |
| 2009/0318826 | A1 * | 12/2009 | Green | A61B 5/048 600/545 |
| 2011/0218460 | A1 * | 9/2011 | Masuzawa | A61B 5/11 600/595 |
| 2011/0248822 | A1 * | 10/2011 | Sarihan | H04N 7/15 340/5.81 |
| 2011/0267222 | A1 * | 11/2011 | Craig | G01S 13/878 342/25 B |
| 2011/0274249 | A1 * | 11/2011 | Gray | G01V 5/0008 378/87 |
| 2012/0136573 | A1 * | 5/2012 | Janardhanan | G01C 21/165 701/512 |
| 2013/0002434 | A1 * | 1/2013 | Cuddihy | G08B 21/043 340/573.7 |
| 2013/0038498 | A1 * | 2/2013 | Ferrer-Herrera | H01Q 21/007 343/788 |
| 2013/0113647 | A1 * | 5/2013 | Sentelle | G01S 13/32 342/22 |
| 2013/0278382 | A1 * | 10/2013 | Cristache | G07C 9/00111 340/5.65 |
| 2013/0278388 | A1 * | 10/2013 | Cristache | G06K 7/10009 340/10.1 |
| 2013/0278389 | A1 * | 10/2013 | Cristache | G06K 7/10366 340/10.1 |
| 2013/0278390 | A1 * | 10/2013 | Cristache | G01S 13/876 340/10.1 |
| 2013/0300573 | A1 * | 11/2013 | Brown | A61B 5/1113 340/870.01 |
| 2014/0368378 | A1 * | 12/2014 | Crain | G01S 5/02 342/25 A |
| 2014/0375429 | A1 * | 12/2014 | Cristache | G01S 13/876 340/10.1 |
| 2014/0375431 | A1 * | 12/2014 | Cristache | G01S 13/876 340/10.1 |
| 2015/0063321 | A1 * | 3/2015 | Sadek | G01S 7/021 370/336 |
| 2015/0077282 | A1 * | 3/2015 | Mohamadi | G01S 7/415 342/27 |
| 2015/0133043 | A1 * | 5/2015 | Patel | F24F 11/0001 454/258 |
| 2015/0157242 | A1 * | 6/2015 | Sabesan | G01B 11/00 600/474 |
| 2015/0206409 | A1 * | 7/2015 | Visvanathan | A61B 5/002 340/573.1 |
| 2015/0237067 | A1 * | 8/2015 | Talyansky | H04L 67/02 726/23 |
| 2015/0301167 | A1 * | 10/2015 | Sentelle | A61B 5/0205 342/22 |
| 2015/0338510 | A1 * | 11/2015 | Pandharipande | G01S 7/524 367/93 |
| 2016/0139659 | A1 * | 5/2016 | Ho June | G01S 3/7864 345/156 |
| 2016/0363336 | A1 * | 12/2016 | Roth | F24F 11/30 |

FOREIGN PATENT DOCUMENTS

| | | | | |
|---|---|---|---|---|
| WO | WO-2013141922 A2 * | 9/2013 | | G01S 13/88 |
| WO | WO-2013141922 A9 * | 11/2013 | | G01S 13/88 |

OTHER PUBLICATIONS

Nieh, C.-M., et al., "Adaptive Beam-Steering Antenna for Improved Coverage of Non-Contact Vital Sign Radar Detection," 2014 IEEE MTT-S International Microwave Symposium (IMS2014), Jun. 1-6, 2014, in 3 pages.

* cited by examiner

SYSTEMS AND METHODS FOR DETECTION OF OCCUPANCY USING RADIO WAVES

CROSS-REFERENCE TO RELATED APPLICATIONS

This application claims the benefit of U.S. Provisional Application No. 62/250,774, filed Nov. 4, 2015, U.S. Provisional Application No. 62/259,576, filed Nov. 24, 2015, U.S. Provisional Application No. 62/288,389, filed Jan. 28, 2016, U.S. Provisional Application No. 62/288,361, filed Jan. 28, 2016, U.S. Provisional Application No. 62/288,383, filed Jan. 28, 2016, and U.S. Provisional Application No. 62/289,287, filed Jan. 31, 2016. Each of the foregoing applications is hereby incorporated by reference herein in its entirety.

STATEMENT REGARDING FEDERALLY SPONSORED R&D

This invention was made with government support under contract number 1417308 awarded by the National Science Foundation and grant number DE-OE0000394 awarded by the Department of Energy. The government has certain rights in the invention.

BACKGROUND OF THE INVENTION

Field of the Invention

The invention relates to the field of radio wave applications including, for example, Doppler RADAR application.

Description of the Related Art

Occupancy detection sensors are generally installed to determine if there is a presence of one or more living entities, such as persons, in an area of coverage. The occupancy detection sensors can use one or more infrared sensors or ultrasonic sensors to detect motion. Furthermore, for the past twenty five years, efforts have been made to develop techniques to assess respiratory motion and muscle function. It is anticipated that through these efforts further enhancement in respiratory rehabilitation, diagnosis, and medicine will be made. Some of the recent efforts include the utilization of a webcam based approach in the hopes of developing a low cost system for monitoring respiration.

SUMMARY OF THE INVENTION

For purposes of summarizing the disclosure, certain aspects, advantages and novel features have been described herein. It is to be understood that not necessarily all such advantages can be achieved in accordance with any particular embodiment disclosed herein. Thus, the embodiments disclosed herein can be embodied or carried out in a manner that achieves or optimizes one advantage or group of advantages as taught or suggested herein without necessarily achieving others.

In certain embodiments, a sensor can detect a presence of a person in an area of coverage using radio waves. The sensor can include a transmitter that can transmit radio signals in an area of coverage and in a first direction which is at an angle from a plane parallel to a floor of the area of coverage, the angle is greater than 0. The sensor can also include a receiver that can receive the transmitted radio signals reflected back from the area of coverage. The sensor can further include a signal conditioning circuit that can process the received radio signals. In some embodiments, the sensors includes one or more hardware processors that can analyze the processed radio signals and detect a presence of a person in the area of coverage based on the analysis.

In some embodiments, a method for detecting a presence of a person in an area of coverage using radio waves can include transmitting a radio wave in a first direction in an area of coverage. The method can further include receiving the transmitted radio wave from the area of coverage. The method can also include extracting a time domain feature from the received radio wave. In some embodiments, the method can include extracting a frequency domain feature from the received radio wave. Furthermore, the method can include detecting a presence of a person in an area of coverage based on the extracted time domain feature and the frequency domain feature.

In some embodiments, a sensor is disclosed that can detect a presence of a person in an area of coverage using radio waves. The sensor can include a transmitter that can transmit radio signals in an area of coverage and in a first direction. The sensor can also include a receiver that can receive the transmitted radio signals reflected back from the area of coverage. The sensor can also include one or more hardware processors that can receive an input from a second sensor and control an operation of the transmitter based on the received input from the second sensor. In some embodiments, the second sensor is an infrared sensor or an ultrasonic sensor.

BRIEF DESCRIPTION OF THE DRAWINGS

Certain aspects, advantages, and features of the invention are described herein. It is to be understood, however, that not necessarily all such aspects, advantages, and features are necessarily included or achieved in every embodiment of the invention. Thus, the invention may be embodied or carried out in a manner that includes or achieves one aspect, advantage, or feature, or group thereof, without necessarily including or achieving other aspects, advantages, or features as may be taught or suggested herein. Certain embodiments are illustrated in the accompanying drawings, which are for illustrative purposes only.

DETAILED DESCRIPTION

The following disclosure describes embodiments of a type of a sensor for detection of occupancy in an area of coverage, such as a room. Generally, conventional occupancy sensors may use infrared or ultrasonic radiation to detect motion in an area of coverage. These conventional occupancy sensors, however, trigger lights or other electronics even if the motion is not related to a presence of human. Moreover, these conventional sensors sometimes trigger powering down of lights in an area of coverage even in the presence of humans. For example, humans may be stationary for a long period of time in offices or meetings. The IR based sensor may not detect any motion because of the stationary person and send a false trigger to turn off the lights in an office. An improved occupancy detection sensor, as disclosed herein, can reduce false positives triggered by non-human motions or false negative related to stationary person. The improved occupancy detection sensor can be used for various applications including, but not limited to, smart buildings, smart homes, building automation, home automation, and electricity and energy saving. The improved occupancy sensor uses radio waves and application of Doppler radar techniques. Doppler radar has advantages of non-contact and noninvasive features that can measure small vibration at low velocity of a target from a distance. The improved occupancy sensor can also work in conjunction with the conventional sensors, such as infrared or ultrasonic sensors.

Occupancy Detection Sensor

Figure 1A:
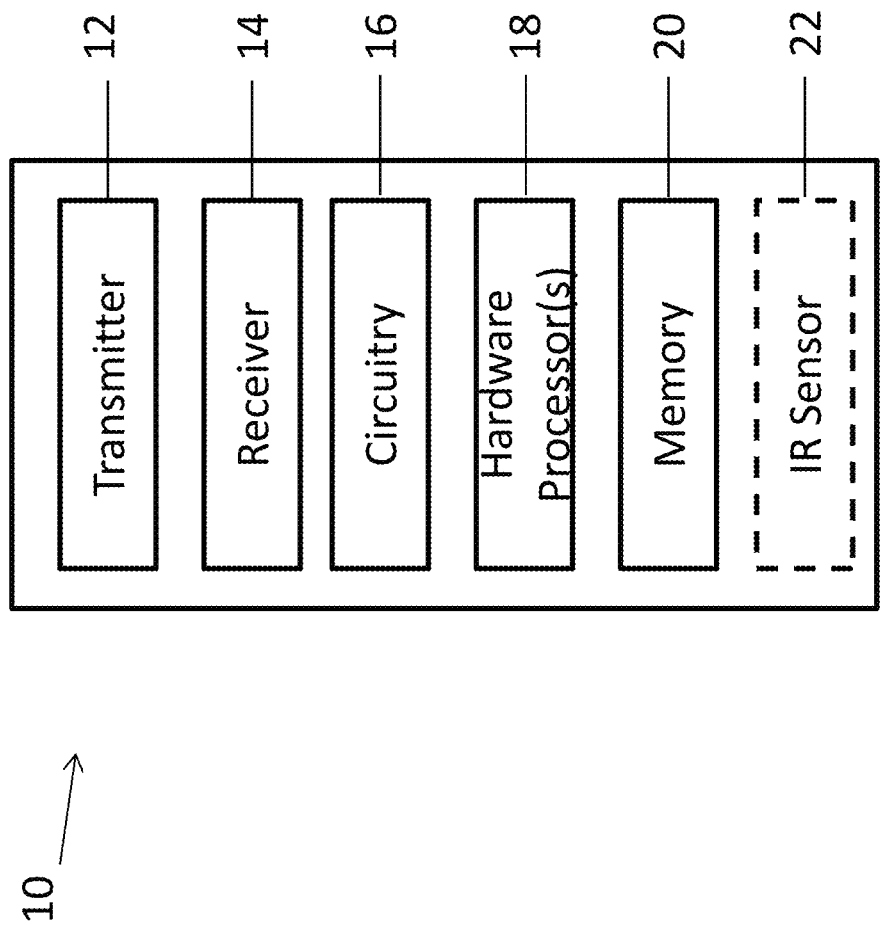
FIG. 1A illustrates a block diagram of an occupancy sensor according to an embodiment of the present disclosure.

FIG. 1A illustrates a block diagram of an embodiment of an occupancy detection sensor 10. In the illustrated embodiment, the occupancy detection sensor 10 includes multiple hardware components to enable the sensor 10 to detect one or more persons in an area of coverage. The area of coverage can correspond to a room or a meeting space or any location that may require detection of presence of people.

The sensor 10 includes a transmitter 12. The transmitter 12 can be a loop antenna. The loop antenna can be printed on a control surface panel. The antenna can be affixed or mounted on a chassis of the sensor 10. The antenna can be mounted such that the direction of the radio waves emitted from the antenna is in preset direction as discussed below. In an embodiment, the transmitter 12 can transmit both the sensing radio signals and communication signals between other sensors and computing systems. The transmitter 12 can also include multiple antennas for separate transmission of sensing and communication signals. In an embodiment, the radio signals are transmitted at a frequency of 2.4 GHz. The radio signals can also be transmitted at 900 MHz, 5.8 GHz, 10 GHz, or 24 GHz. The transmitter 12 can operate in any frequency according to government or other standards based frequency ranges.

The sensor 10 also includes a receiver 14 for detection of the radio signals which were transmitted and reflected back. The receiver 14 can share the antenna with the transmitter 12. In an embodiment, the receiver 14 includes a separate antenna from the transmitter 12. The receiver 14 can include multiple antennas oriented in different directions to collect the reflected signals.

The sensor 10 can further include circuitry 16 for power management. The sensor 10 can receive power from an on-board battery or a wall power supply. The power management circuitry can provide power to the transmitter 12 and other hardware components of the sensor 10. The circuitry 16 can also include a signal conditioning circuitry. For example, the signal conditioning circuit can implement low pass filters, high pass filters, band pass filters, amplification, or other signal conditioning to process received signals at the receiver 14.

Figure 1B:
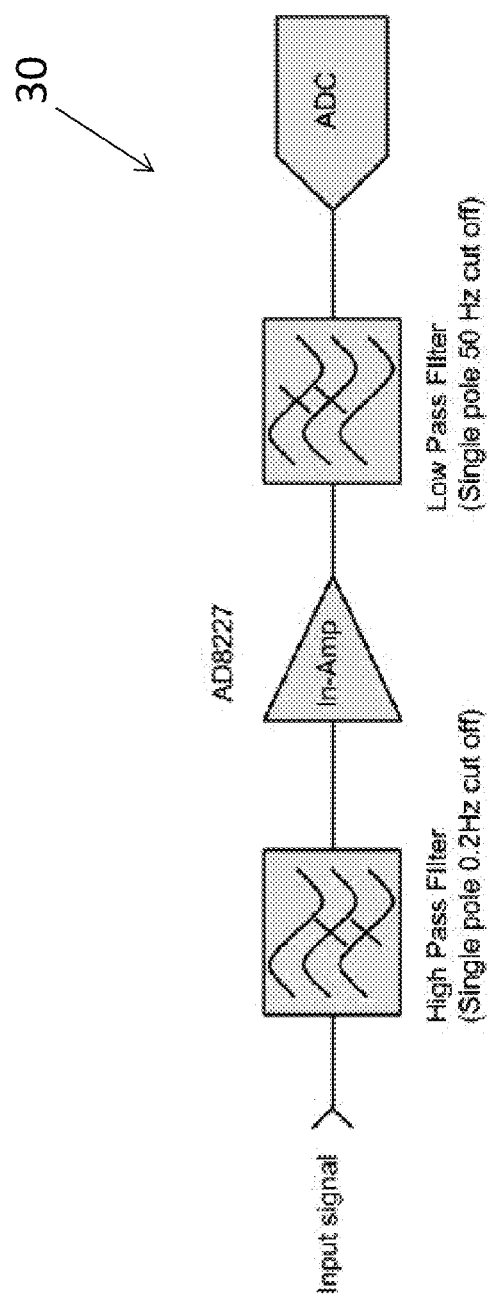
FIG. 1B illustrates a block diagram of signal conditioning circuitry according to an embodiment of the present disclosure.

FIG. 1B illustrates a block diagram of an embodiment of a signal conditioning circuit 30. The signal conditioning circuit 30 can include a single-pole high pass filter with a 0.2 Hz of cut-off frequency. The cut-off frequency can be increased or decreased to filter out noise from DC and other low frequency noise sources. The signal conditioning circuit 30 can include an amplifier to amplify the received signals. In an embodiment, the amplifier is an AD8227 amplifier from Analog Devices. The gain of the amplifier can be adjusted by a feedback resistor. The signal conditioning circuit 30 can also include a low pass filter with a cut-off frequency of 50 Hz. The low pass filter signal can be fed into an analog to digital converter.

Figure 1C:
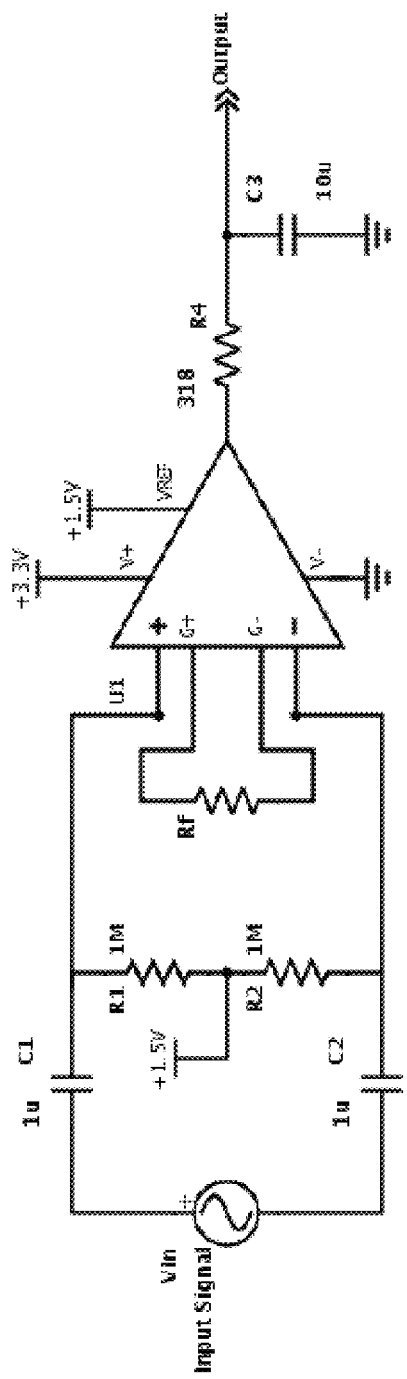
FIG. 1C illustrates a schematic of a baseband circuit according to an embodiment of the present disclosure.
Figure 1D:
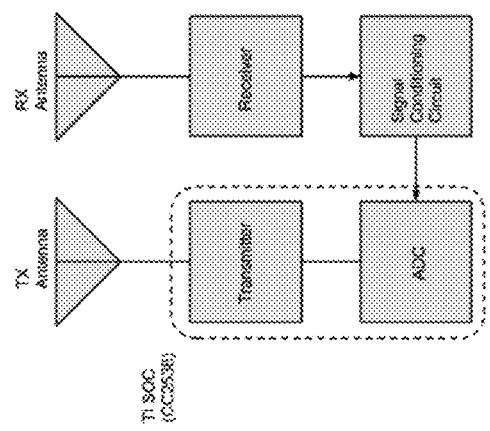
FIG. 1D illustrates a block diagram of bistatic configuration according to an embodiment of the present disclosure.
Figure 1E:
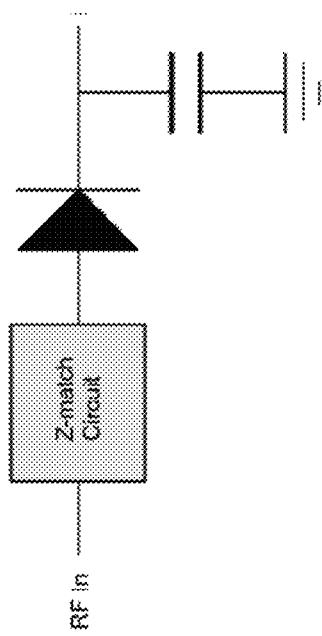
FIG. 1E illustrates a schematic of a detector circuit according to an embodiment of the present disclosure.

FIG. 1C illustrates a schematic of a baseband circuit. In one embodiment, the sensor 10 includes a single-channel bistatic architecture for transmitter 12 and receiver 14 as shown in FIG. 1D. In the bistatic configuration, a system on a chip (SoC) CC2538 from Texas Instruments (TI) can be used to transmit a 2.4 GHz signal. A zero biased schottky diode HSMS2850 from Avago Technologies can be used to for an envelope detector circuit as shown in FIG. 1E. In an embodiment, the output signal of the envelope detector circuit is filtered and amplified by the signal conditioning circuit as shown in FIG. 1B and input to the ADC of the SoC shown in FIG. 1D. In an embodiment, the mixer in FIG. 1F can be replaced by a zero based Schottky diode, and the LO and RF signal are fed at the input of the diode through LO and RF isolation circuit. In some embodiments, envelope detection can be used in conjunction or as an alternative with the processes described below with respect to FIGS. 4A to 4C.

Figure 1F:
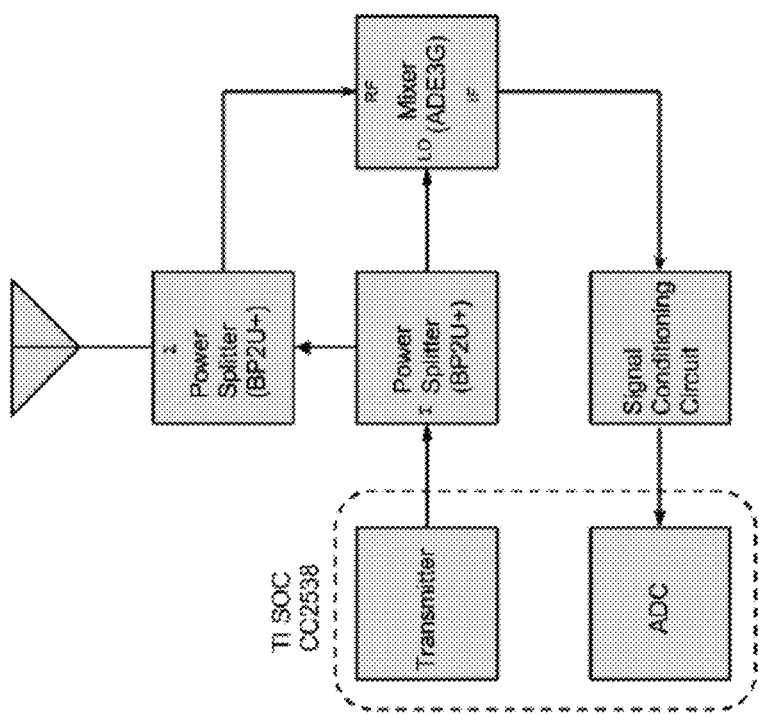
FIG. 1F illustrates a block diagram of a transceiver configuration according to an embodiment of the present disclosure.

In some embodiments, the transmitter 12 and receiver 14 can be implemented as a single-channel transceiver as shown in FIG. 1F. In this configuration, the system on a chip (SOC) CC2538 from Texas Instruments can output a 2.4 GHz signal. The signal is split to LO and RFout signal by 0 degree power splitter. The LO signal is input to LO port of Mixer. The signal (RFout) is fed into another power splitter which works as a circulator and then radiated by the antenna. The radiated signal will be reflected back and received by same antenna. The received signal (RFin) is fed into the splitter and input to RF port of the mixer. The IF signal is input to the signal conditioning circuit designed in section 1 and input to ADC of the SoC. In an embodiment, the mixer in FIG. 1F can be replaced by a zero based Schottky diode, and the LO and RF signal are fed at the input of the diode through LO and RF isolation circuit.

The sensor 10 can also include one or more hardware processors 18 that are programmed to execute instructions stored in the memory 20. In some embodiments, the sensor 10 relays information to an external computing system using a wired or wireless communication for further processing.

The memory 20 can further store training data, current state of the system, event log, heart rate, respiration rate, and any other data related to occupancy sensors. The memory 20 can further store calibration data for the sensors and calculations including thresholds In some embodiments, the sensor 10 can include an integrated infrared (IR) sensor 22 or an ultrasonic sensor that is capable of monitoring an area of interest for motion. The IR sensor 22 can provide a first pass monitoring of the area. The IR sensor 22 may require less processing than radar detection. Accordingly, the IR sensor 22 may consume less power in some instances than using radar based detection as discussed below. However, as discussed above, there are limitations to the IR sensor 22. Thus, the sensor 10 may include an IR sensor 22 or may receive an input from an external IR sensor 22 as a first pass detection prior to transmitting and processing the radio signal. In some embodiments, the sensor 10 does not include an IR sensor 22 and uses only the radio signals for detecting a presence of persons in an area of coverage.

The sensor 10 can control operation of electronic systems, such as a light switch, an HVAC system, a fan, a television, and the like. In an embodiment, the sensor 10 is integrated directly with the switch that controls these electronic systems. In the integrated sensor, for example, the sensor 10 can activate a relay to control operation of the electronics. In other embodiments, the sensor 10 is integrated with conventional sensors and operates in combination with, for example, the IR sensor as discussed below.

In yet other embodiments, the sensor 10 operates independently of conventional sensors or switches and can transmit a control signal to the IR sensors and/or the electronic systems wirelessly. The control signal can be 802.15.4 ZigBee or WiFi, or other protocols, depending on the applications.

In some embodiments, the area of coverage can include multiple sensors 10. Multiple sensors can also enable increase of the area of coverage. The multiple sensors can communicate with each other wirelessly. Moreover, multiple sensors 10 can be integrated into a mesh network to increase the size of the area of coverage. The mesh network can be generated using 802.15.4 ZigBee or WiFi, or other protocols, depending on the specifications of the network. Having multiple sensors 10 in an area of coverage can enable redundant and diverse sensor signals. Multiple sensors 10 can also be used the ODS system discussed below to prevent possible failure of a sensor to detect a person at null locations of radio transmission. The number of sensors depends on the area of coverage and the geometry of the area of coverage. In some embodiments, the multiple sensors 10 do not interfere with each other due to the effect of range correlation for a homodyne system even though they might operate at the same frequency. In a mesh network implementation, each sensor 10 can be programmed to manage itself as well as its communication with other sensors 10 in the mesh. The control of operations can be executed by the one or more hardware processors 18. In an embodiment, one or more of the sensors 10 in the mesh transmit the data to a management computing system. The management computing system can be local or remotely located on a server. The management system can include one or more hardware processors to analyze the received data and generate a control signal to turn on/off the lights or other electronics based on the rules determined for monitoring. Mesh-based occupancy sensors can provide critical occupancy data for a larger distributed energy monitoring. In some embodiments, sensors 10 used in a mesh can improve accuracy, reliability and provide better dynamic response.

Occupancy Detection System (ODS)

Figure 2:
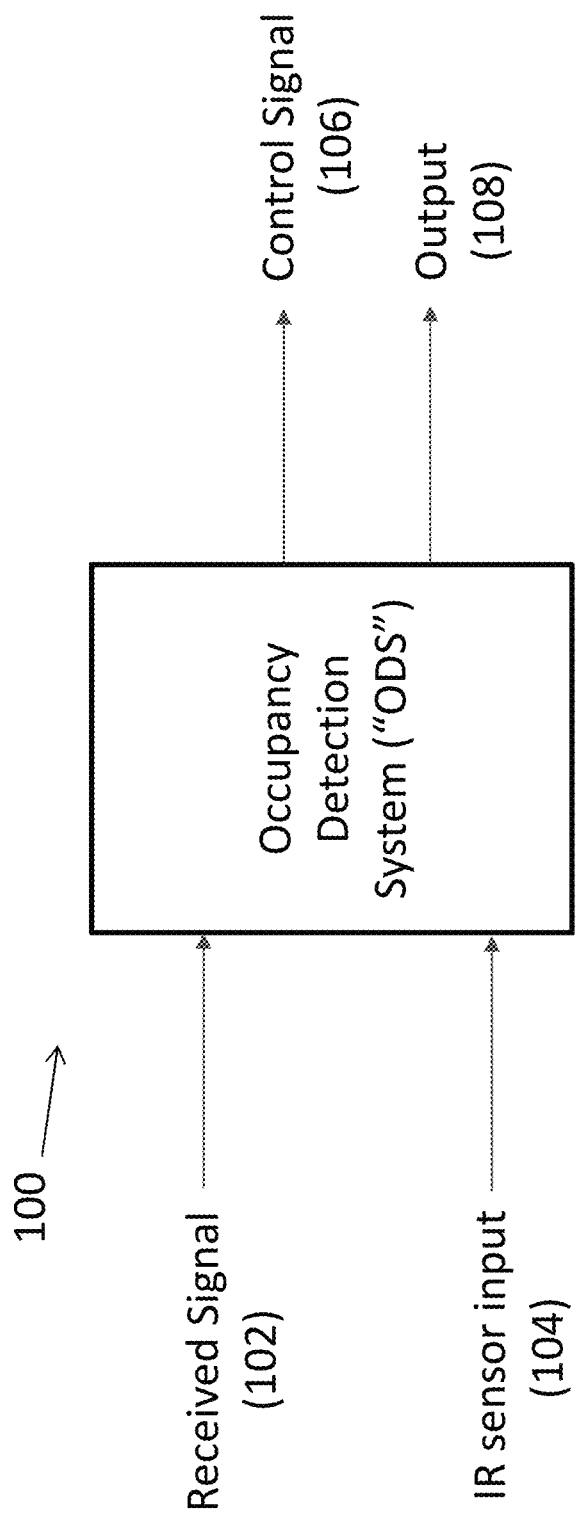
FIG. 2 illustrates a block diagram of an occupancy detection system according to an embodiment of the present disclosure.

FIG. 2 illustrates a block diagram of an embodiment of an occupancy detection system ("ODS") 100. The ODS 100 can include programming instructions described herein for detection of input conditions and control of output conditions. The programming instructions can be stored in the memory 20 of the sensor 10 or an internal memory of the one or more hardware processors 18. In some embodiments, the programming instructions correspond to the processes and functions described herein. The ODS 100 can be executed by one or more hardware processors 18 of the sensor 10. In some embodiments, some or all of the aspects of the ODS 100 can be executed by a remote computing system (not shown). The programming instructions can be implemented in C, C++, JAVA, or any other suitable programming languages. In some embodiments, some or all of the portions of the ODS 100 can be implemented in application specific circuitry 928 such as ASICs and FPGAs.

The ODS 100 processes radar signals 102 received by the receiver 14. In some embodiments, the radar signals are pre-processed through hardware elements as discussed above prior to receiving as input. The ODS 100 implements some of the processes described below. For example, the ODS 100 can also filter signals to remove noise or select particular frequency components. The ODS 100 can also perform signal processing including implementation of correlation algorithms, peak detection, envelope detection, and the like.

The ODS 100 can also process IR sensor (or conventional sensor) input 104. In some embodiments, the IR sensor input 104 includes an indication of presence or absence of a motion in an area of coverage. The ODS 100 can use the IR sensor input 104 to control operation of the sensor 10. In some embodiments, the ODS 100 begins transmission of radio waves only after the IR sensor input 104 indicates a lack of motion for a time period. The ODS 100 can then perform a secondary check to detect that a stationary person exists in area of coverage who was not detected by the IR sensor.

The ODS 100 can transform the received signals 102 to generate a control signal 106 and one or more outputs 108. The control signal 106 can include for example a signal to an electrical switch to trigger lights. The control signal 106 can also include communication protocol signals to other sensors or computing systems. The ODS 100 can also generate an output for display to users. The output can include cardiopulmonary parameters such as respiration rate or heart rate.

Occupancy Detection Processes

Figure 3:
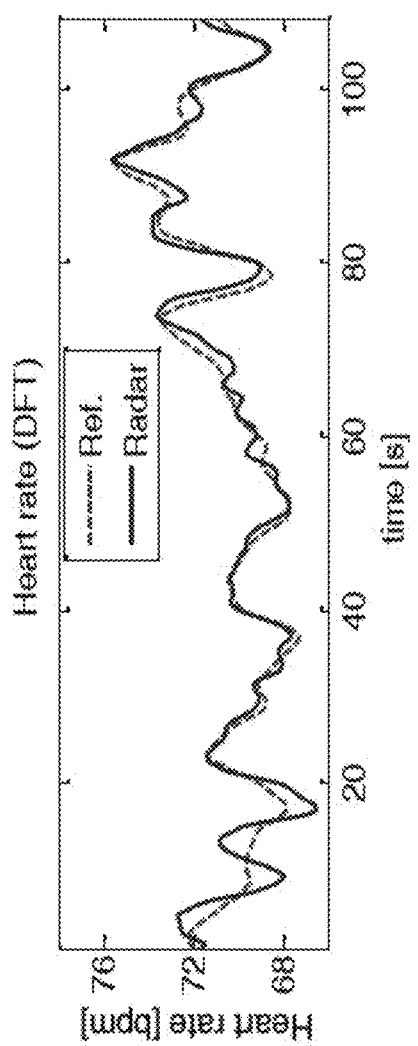
FIG. 3 illustrates a comparison of detected heart rate from the occupancy detection system and a reference.

FIG. 3 illustrates a detection of a physiological parameter using ODS 100. In the illustrated embodiment, the ODS 100 detected heart rate of a person in an area of coverage at rest. The detection from ODS 100 ("radar" plot) tracks closely with the reference heart rate measured independently. Accordingly, the ODS 100 can track detection of heart rate to determine if a person is present in a room and control electronics based on the detection.

Figure 4A:
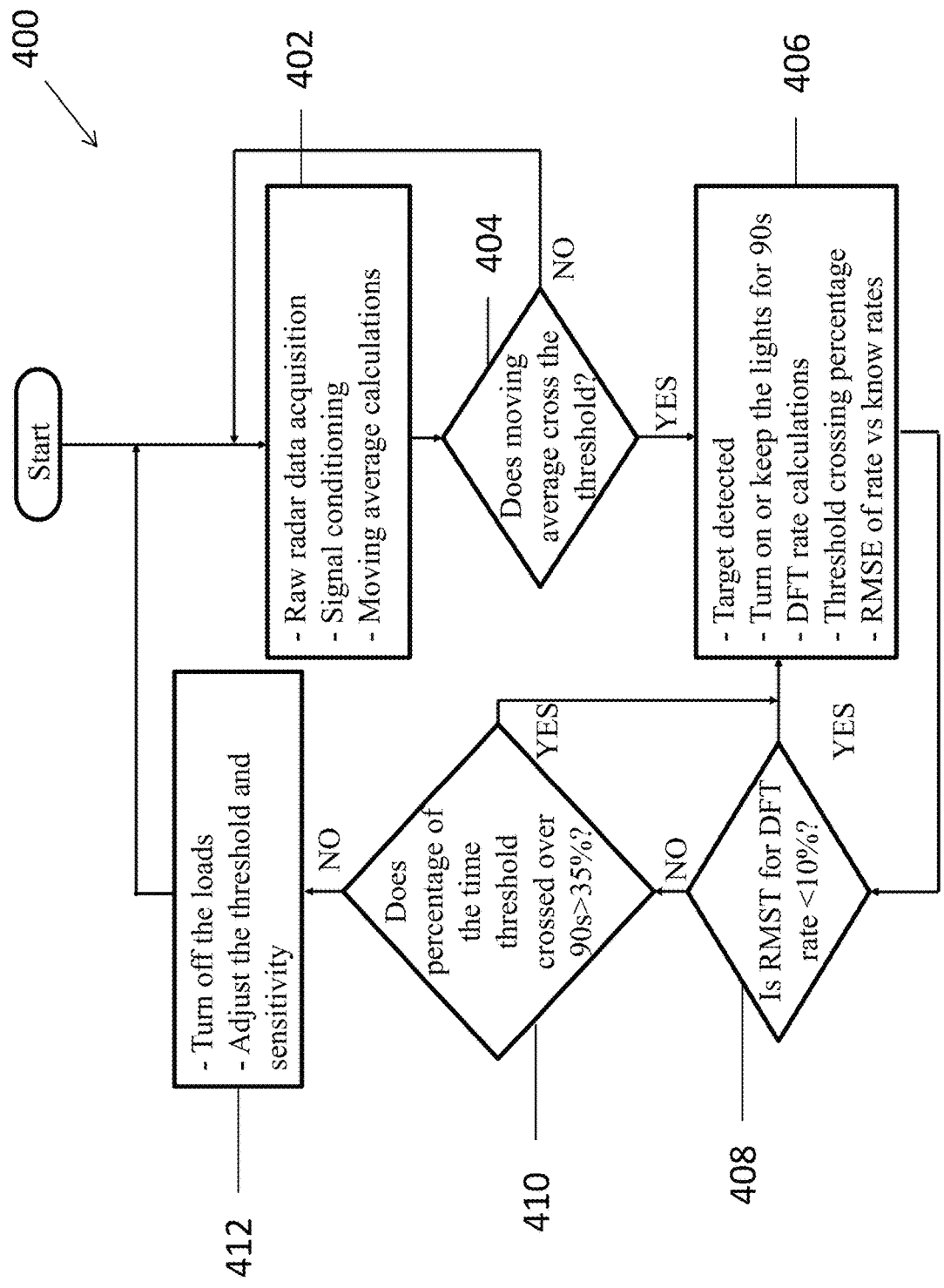
FIG. 4A illustrates a flow chart of a process for detecting a presence of a person and controlling load based on the detection, according to an embodiment of the present disclosure.

FIG. 4A illustrates a flowchart of an embodiment of a process 400 for detection of occupancy. The process 400 can be implemented by any of the systems described herein. In an embodiment, the process 400 is implemented by a combination of the ODS 100 and the sensor 10 including the one or more hardware processors 18.

In an embodiment, the process 400 begins at block 402 with receiving signals from the receiver 14. The received signals can correspond to the signals that were transmitted by the transmitter 12 and have returned back through reflection or other physical processes. The received signals may also include noise and other signals of no interest. As discussed above, the sensor 10 can include circuitry 16 that can use signal conditioning to process the received signals. In some embodiments, signal conditioning can be performed entirely by the circuitry 16. In other embodiments, the ODS 100 can perform signal conditioning entirely or in combination with the circuitry 16. Additional signal conditioning can include filtering, amplification, DC removal and the like.

Furthermore, the ODS 100 can identify a window of the received signal in time domain. The ODS 100 can continuously store the received signal in a buffer based on the size of the window. In an embodiment, the buffer is a circular buffer. The size of length (N) of the window can be predetermined. In an embodiment, the length of window is 5 seconds. In other embodiments, the length of window is greater than 5 seconds or less than 5 seconds, such as 1 second or 10 seconds or 20 seconds. The size of the window can also depend on the geometry of the area of coverage. For a windowed signal with the length N the average of the squared signal is calculated:

$$Ave(t) = \frac{[B_{c1}(t)^2 + B_{c2}(t)^2 + \ldots + B_{cN}(t)^2]}{N}, \quad \text{Eq. (1)}$$

where Ave(t) is the moving average output, and $B_c(t)$ is the amplitude of the processed signals. The moving average may also relate to power of the signal. The ODS 100 can repeat the sliding window and average calculations over the stored signal with 0.5 second steps. The step interval can be greater or less than 0.5 seconds in some embodiments.

At block 404, the ODS 100 can compare the moving average calculation with a threshold. If the moving average calculation exceeds the threshold, the ODS 100 can determine that a target has been detected. The ODS 100 can retrieve a threshold value from the memory. In an embodiment, the threshold is $1 \times 10^{-5}$. This value of threshold depends on system parameters and can change depending on the frequency of transmission and other electrical and structural properties of the transmitter and the area of coverage. The threshold can be predetermined and stored from a previous calibration. In some embodiments, the threshold is dynamically updated by the ODS 100 based on a calculation of an average of the moving average over time and the standard deviation of the moving average calculation shown above. The threshold may change due to the change in noise level or temperature or other parameters in the area of coverage. Based on this detection, the ODS 100 can change an operating state of an electronic system, such as turn on the lights for a specific period of time or maintain existing state of the electronic system. The state of the electronic system can be stored in the memory of the sensor 10. In an embodiment, the specific period of time is 90 seconds. The specific period of time can vary based on user preferences or stored parameters. If the threshold has not been crossed, the ODS 100 can continue processing new signals and return back to the block 402.

If the moving average crosses the threshold, the ODS 100 can trigger lights or maintain the state of the lights. In some embodiments, the ODS 100 can perform secondary calculations to determine whether to keep the lights on and adjust the threshold as described below with respect to blocks 410 to 414 of the process 400. For example, the ODS 100 can transform the received signals in time domain to frequency domain for further analysis. For example, the ODS 100 can use a Fast Fourier Transform (FFT) or other frequency transform to transform a window of time domain signal into frequency domain. The ODS 100 can extract physiological rate variation with time based on the transformed signal. The ODS 100 can use a Kaiser window and move by 0.5 second increments. The ODS 100 can further apply an exponential filter or other smoothing filters to smooth the output rate. The ODS 100 can use additional techniques, such as spectrum masking technique, to remove parts of the spectrum close to DC component of the signals, such as 0 to 0.1 Hz. The DC component is generally dominated by flicker noise and can cause error in rate calculation. The ODS 100 can also remove frequency components of the signal that are not in the frequency of interests. The frequency of interest includes frequencies corresponding to physiological processes. For example, the frequency of interest corresponds to heart beats or respiration rate of humans. In some embodiments, the frequency of interest can also correspond to physiological processes of pets, such as dogs or cats. An example illustration of the calculated heart rate by the ODS is shown in FIG. 3.

In some embodiments, the ODS 100 can calculate a percentage of the times that the threshold is crossed and/or root mean square error (RMSE) of a particular physiological rate, such as respiration rate, or the heart rate based on predetermined stored values. The RMSE is an example of a deviation calculation. In other embodiments, the ODS can calculate other measures of deviation. The ODS 100 can change the state of the lights based on the percentage and/or RMSE. For example, at block 408, if the ODS 100 determines that the RMSE for a particular rate is less than 10%, the ODS 100 can continue to keep the lights on and return back to block 408.

Further, at block 410, if the RMSE is greater than 10%, but the percentage of the times threshold is crossed over in the time period is higher than 35%, the ODS 100 can continue to keep the lights on. If none of the above criteria are met during the 90 seconds, the ODS 100 can turn off the lights at block 412. The numerical values, such as 10%, 35%, and 90 seconds are listed as examples and can vary based on the parameters of the sensor 10 and/or the geometry of the area of coverage. These may also be dynamically updated during operation of the sensor 10 by the ODS 100. For example, at block 412, the ODS 100 can modify the threshold and accordingly the sensitivity of the sensor 10. The ODS 100 can return back to monitoring received signals after turning off the lights.

Figures 5A, 5B, 5C, 5D:
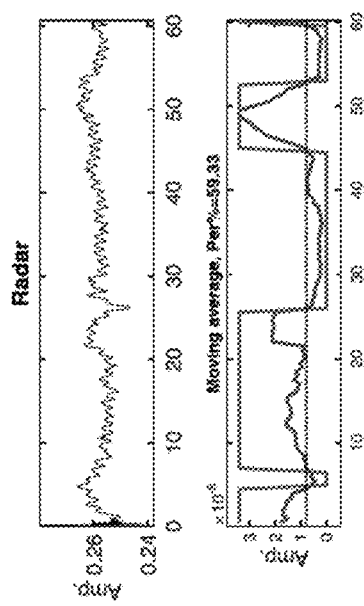
FIGS. 5A to 5D illustrate transformation of received radio signals.

FIGS. 5A to 5D illustrate plots of some of the calculations or signals discussed above with respect to the process 400. FIG. 5A illustrates a received radar signal. FIG. 5B illustrates a calculation of the moving average with respect to a threshold. FIG. 5C illustrates the calculated rate with the RMSE of zero. FIG. 5D illustrates the spectrum of the 90 second of signal.

In an embodiment, the process 400 can include comparison of signal or portions of the signal using a machine learning or neural network algorithm. The neural network can be constructed with three layer networks: the input layer inputs key vectors, response vectors, and the associative relation between vectors. In an embodiment, the neural network is a Back-Propagation (BP) Neural Network. By providing input examples and known-good output, the network learns what type of behavior is expected and adapts the threshold (as discussed above) for different environment. The neural network can discriminate the human cardiopulmonary motion from other types of motion, such as regular mechanical movement, including examining the interval between the peaks in the signal waveform.

Figure 4B:
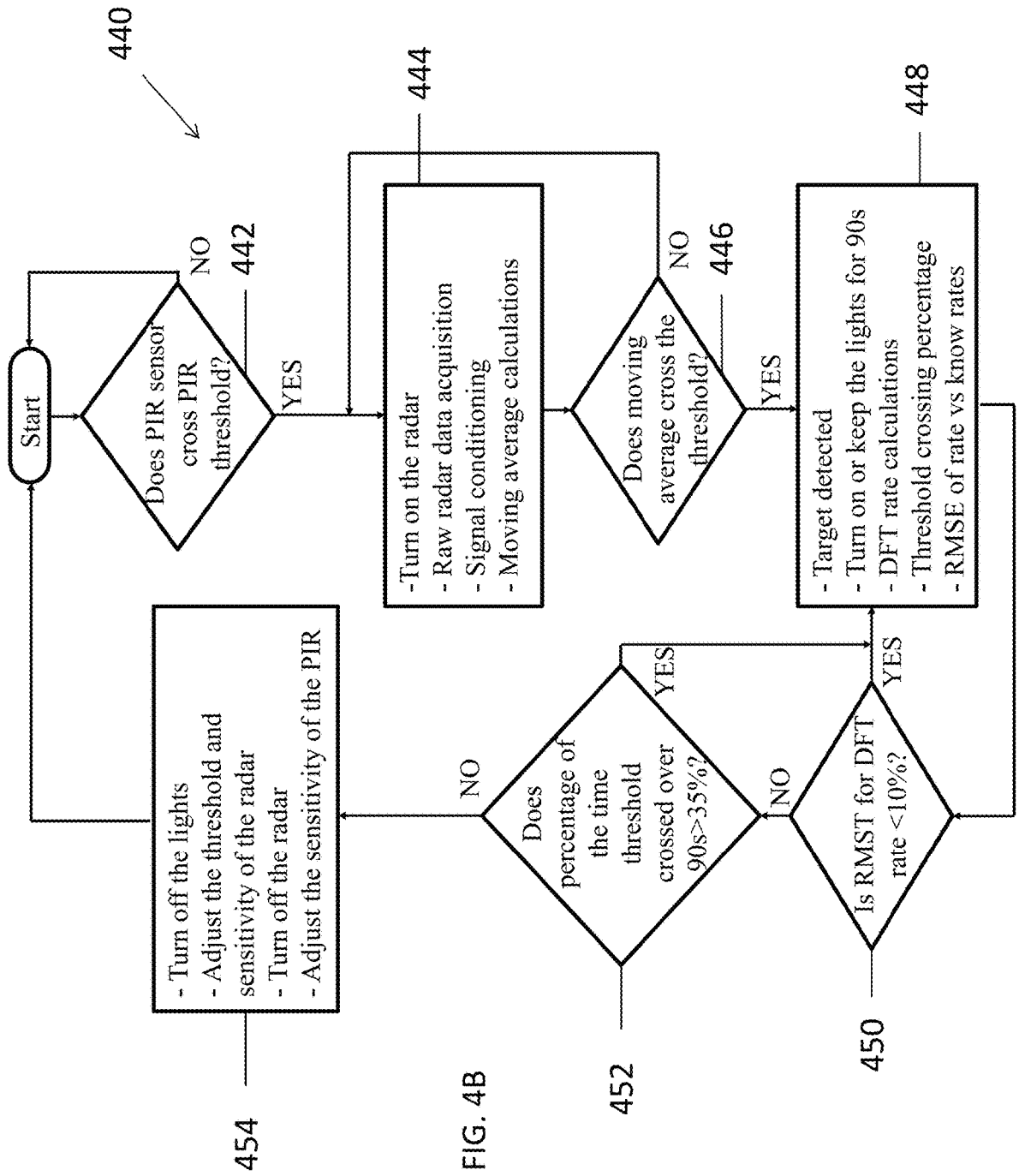
FIG. 4B illustrates a flow chart of a process for detecting a presence of a person in conjunction with an infrared sensor, according to an embodiment of the present disclosure.

FIG. 4B illustrates a flow chart of a process 440 for detection and control of an electronic system using the sensor 10 in conjunction with a built in or an external infrared sensor. The process 440 can be implemented by any of the systems described herein. In an embodiment, the process 440 is implemented by a combination of the ODS 100 and the sensor 10 including the one or more hardware processors 18.

In an embodiment, at block 442, the ODS 100 receives an input from an infrared sensor or an ultrasonic sensor. The ODS 100 can continuously poll the infrared sensor or wait for an interrupt to be triggered. The input from the infrared sensor can correspond to whether the infrared sensor has detected a motion or a lack of motion. The ODS 100 can compare the input with an IR threshold. In some instances the input can be binary or defined by particular states indicating events corresponding to an IR sensor. If the ODS 100 determines that the infrared sensor has crossed a corresponding infrared threshold, the ODS 100 can turn on the lights and activate the transmitter 12 for transmitting radio waves for secondary detection. For example, a person may enter a room and sit at a desk for a period of time. The IR sensor 22 can trigger the lights based on the detected motion but may turn off these lights if no motion is detected even if the person is still in the room. This can happen in instances if the person is relatively stationary. Here, radio detection can be used to determine if the person is still in the room to avoid the lights from turning off. At blocks 444, 446, 448, 450, and 452, the ODS 100 can perform similar calculations and analysis as discussed above with respect to block 402, 404, 406, 408, and 410, respectively. At block 454, the ODS 100 can change the state of the light or other electronic system based on the calculation and analysis. Further, the ODS 100 can adjust the threshold and thus sensitivity of the sensor 10. The threshold can be predetermined and stored from a previous calibration. In some embodiments, the threshold is dynamically updated by the ODS 100 based on a calculation of the average and the standard deviation of the moving average calculation. Furthermore, the ODS 100 can stop transmission and enter into a low power mode until another event triggered by the IR sensor. In some embodiments, the ODS 100 can also adjust the sensitivity of the IR sensor and accordingly improve the operation of the IR sensor. For example, radar based detection can confirm if a person is in the room even though the IR sensor did not detect any motion. Accordingly, the ODS 100 can reduce the IR threshold. Over time by adjusting the IR threshold, the ODS 100 can improve the operation of the IR sensor.

Figure 4C:
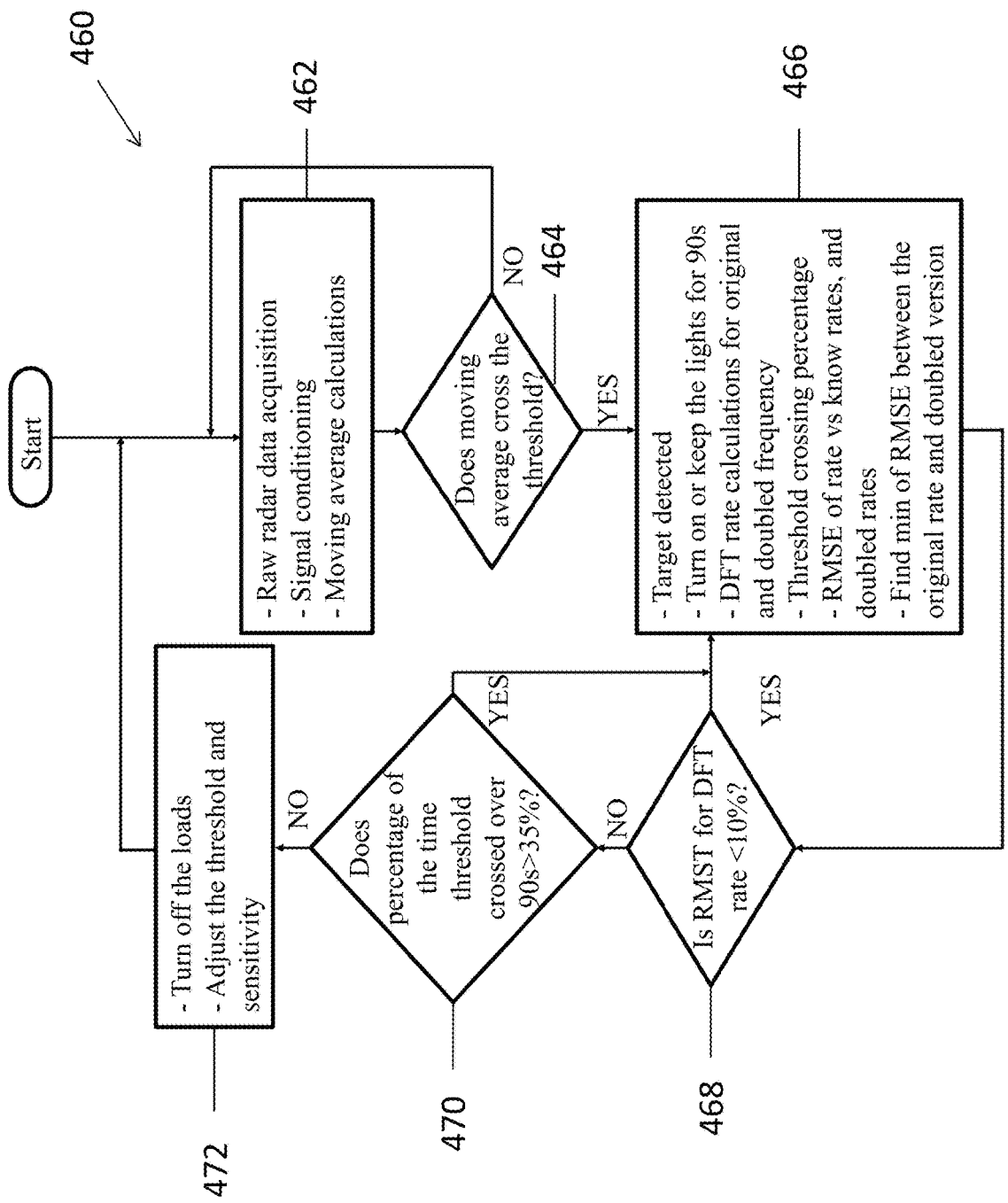
FIG. 4C illustrates a flow chart of a process for detecting a presence of a person with single channel compensation technique, according to an embodiment of the present disclosure.

FIG. 4C illustrates a flow chart of a process 460 for detection and control of an electronic system using the sensor 10. The process 460 can be implemented by any of the systems described herein. In an embodiment, the process 460 is implemented by a combination of the ODS 100 and the sensor 10 including the one or more hardware processors 18. The blocks 462 and 464 can correspond to the blocks 402 and 404, respectively. At block 466, when the ODS 100 detects that the moving average crosses the threshold, the ODS 100 can turn on the lights. As discussed with respect to FIG. 15, the ODS 100 can calculate physiological rates at the base frequency and the second harmonic. The ODS 100 can calculate RMSE of the measured rates with respect to known rate from the base frequency and the second harmonic. The ODS 100 can further identify a minimum of two calculated RMSE values. At block 468, the ODS 100 can compare the minimum RMSE with a 10% threshold. If it exceeds 10%, the ODS 100 can check for percentage of time the threshold was exceeded in a 90 second period. This check can be used by the ODS 100 to take into account fluctuations. If the threshold is not exceeded at least 35% of the time period, the ODS 100 can turn off the loads and adjust the thresholds as discussed above. As discussed above, the numerical values for the thresholds and parameters can vary based on the sensor parameters.

Root Mean Square Distinction

In some embodiments, the ODS 100 can determine root mean square from the amplitude of the received signal in time domain. The root mean square (RMS) can provide indication of motion in an area of coverage. The root mean square detection in time domain can be performed by the ODS 100 in conjunction with the process 400 discussed above. An example analysis of the received signal based on the RMS detection is described below. The root mean square represents the deviation between the known human vital sign rates and the rates determined from the signal. In some embodiments, as discussed with respect to FIG. 4C, the deviation is calculated for both the original known rates and the double of known rates due to null and optimum effects.

The sensor 10 can transmit a radar signal at 2.4 GHz. The radiated signal will be reflected back and received by the receiving antenna, which can be the same or separate from the transmitting antenna. The received signal can be down sampled and passed through signal conditioning circuit. In an embodiment, the signal is further digitized by an analog to digital converter. The digitized signal can be further processed by the one or more hardware processors of the sensor 10. For the purposes of testing, a room of dimensions (3.5 m×4.5 m) was broken into 27 cells according to National Electrical Manufacturers Association (NEMA) standard which is designed for testing occupancy sensors. Blue tapes were used to mark the mechanical target locations throughout the room. The sensor 10 was used to detect presence in the room by detecting small periodic motions such as respiration in each individual cell. A precision single-axis linear stage can be used with a pulse-width modulation (PWM) driver for generating such periodic motions simulating human respiration. Additionally, data collections were taken consisting of radar reflected signal from the same empty room with no mechanical target for estimating noise level in our measurements.

Figure 6B:
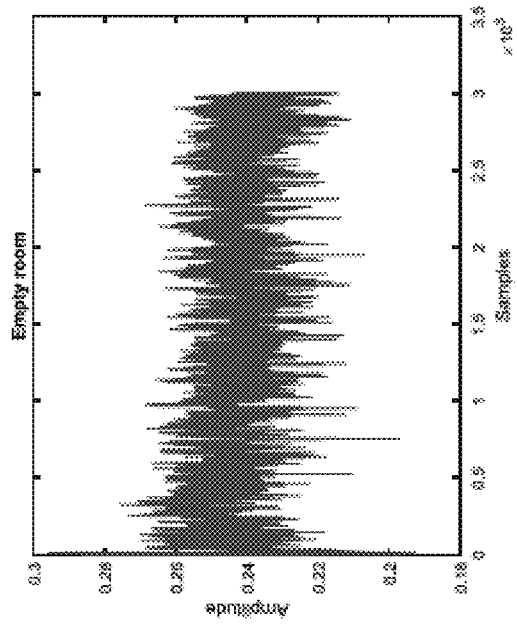
FIG. 6B illustrates radar signal reflected back in an empty room without mechanical target.
Figure 6A:
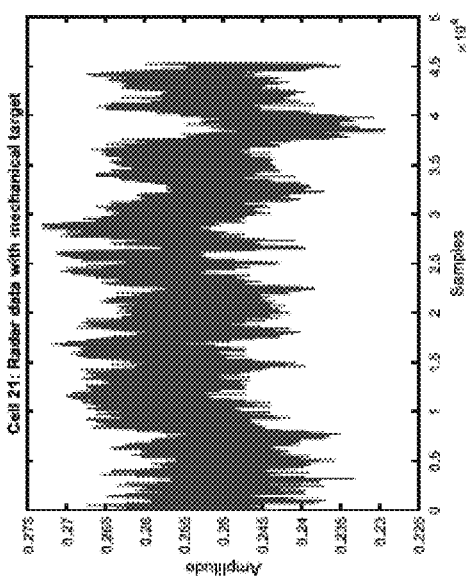
FIG. 6A illustrates radar data from mechanical target test in region of weak radar reflection.

In the time domain, radar data from tests using a mechanical target can look similar visually to data collected from the radar with an empty room. FIG. 6A shows radar signal with a mechanical target in the room and FIG. 6B shows radar signal in the empty room. This can result in difficulty distinguishing between noise and radar signals. After studying the raw radar data from each of the 27 cells tested, it was observed that Cell 5 had the strongest signal due to the closeness (0.5 m) and perpendicularity to the radar antenna. Cell 21 is farther away from the radar field of view and had the weakest signal. The RMS value of Cell 5 was 0.2432 units and the RMS value of Cell 21 is 0.2538 units, comparatively the RMS of one set of empty room data (noise) is 0.2439 units. These values illustrate the similarities in return. In order to account for the amplitude fluctuations observed in the signal, the ODS 100 can calculate the root mean square (RMS) of the time-domain data from various cells. RMS was calculated of the time domain data of radar from mechanical target in all 27 cells/locations in the room and compared with the RMS values of multiple noise recordings.

Figure 7:
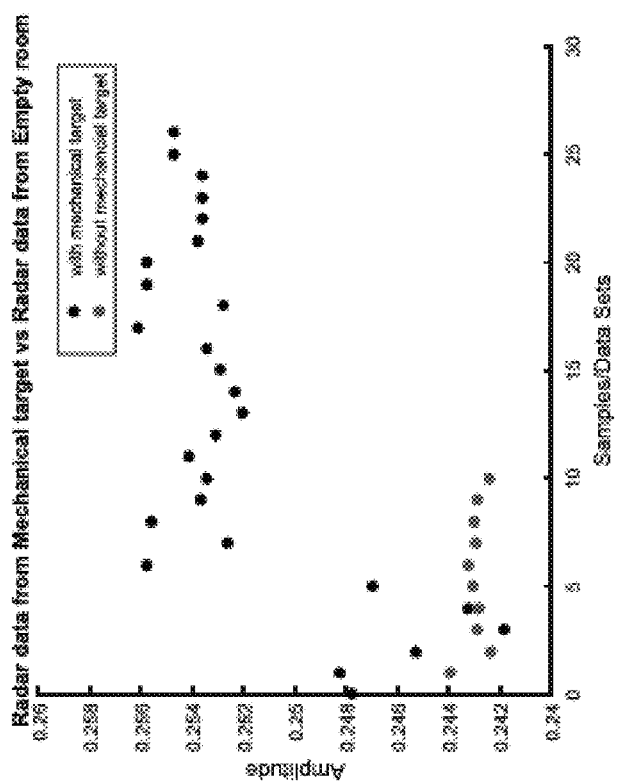
FIG. 7 illustrates time domain root mean square values of a radar signal with and without mechanical target.

FIG. 7 illustrates a plot of the RMS calculations with the mechanical target and without the target in an empty room. There is a distinction between the time domain RMS values. The mean of the RMS values of mechanical target return is 0.2523 units while the mean of RMS values of noise (empty room return) is 0.2430 units. These values yield an average difference of 0.0093 units. This difference is low due to the low frequency utilized in data collection (0.2 Hz). The ODS 100 can increase the data collection frequency to improve the distinguishing features. The ODS 100 can use the difference in RMS values to distinguish a movement in the room from noise.

Respiration Pattern Extraction

In some embodiments, the ODS 100 can monitor respiration patterns to detect a presence of person(s) in an area of coverage. Doppler radar can sense all motion in the field of view, and the phase modulation generated by a human subject typically consists of locomotion, fidgeting, respiratory effort, and heartbeat signals. Locomotion and fidgeting produce large amplitude signals that are easily discerned by the ODS 100. Locomotion and fidgeting can also be detected by an IR sensor 22. It is more difficult to identify a person stationary in an area of coverage using the IR sensor 22. The sensor 10 and ODS 100 can detect cardiopulmonary motion and patterns when a person is stationary.

The respiration rate is usually in the frequency range 0.1-0.8 Hz and heartbeat in the range of 0.8-2 Hz. Since the chest motion associated with respiration is typically two orders of magnitude stronger signal than that of the heartbeat, the ODS 100 can extract the respiration pattern for occupancy detection.

Assuming the RF transmitter on the SoC sends out a single-tone CW signal, $$S_t(t) = \cos(2\pi f_0 t + \varphi(t)), \quad (2.1)$$

Where $f_o$ is the frequency of the transmitted microwave signal, t is the elapsed time and $\varphi(t)$ is the phase noise of the oscillator in the transmitter. Once this signal illuminates a subject at a nominal distance $d_o$ from the sensor 10, it will be phase-modulated by the periodic chest movement, and then reflected signal can be expressed as:

$$S_r(t) = \cos\left(2\pi f_0 t + \frac{2\pi}{\lambda}(2d_0 + 2d(t)) + \phi\left(t - \frac{2d_0}{c}\right)\right), \quad (2.2)$$

Where d(t) represents chest displacement.

The chest movement can be caused by two physiological activities—respiration and heart beat. Assuming respiration and heart beat are two independent time-varying motions with displacements given by x(t) and y(t), then the round trip distance of radar signal is:

$$2d(t) = 2d_0 + 2x(t) + 2y(t). \quad (2.3)$$

Replacing 2d(t) in equation (2.2) with (2.3), when the chest movement period T>>$d_o$/c, where c is the velocity of the microwave signal, and x(t)<<$d_0$, y(t)<<$d_o$, the received signal can be approximated as:

$$S_r(t) = \cos\left(2\pi f_0 t + \frac{4\pi d_0}{\lambda} + \frac{4\pi x(t)}{\lambda} + \frac{4\pi y(t)}{\lambda} + \phi\left(t - \frac{2d_0}{c}\right)\right) \quad (2.4)$$

In an embodiment, the passive sensor node in the sensor mixes the sum of air-coupled transmitted and reflected signal with itself, the resulting low-pass-filtered mixer output signal, e.g. the base band signal will be:

$$B_r(t) = \cos\left(\theta + \frac{4\pi x(t)}{\lambda} + \frac{4\pi y(t)}{\lambda} + \Delta\phi(t)\right), \quad (2.5)$$

where $\Delta\varphi(t)$ is the residual phase noise, and $\theta$ is the constant phase shift related to the nominal distance to the subject with a factor 80 which compensates for the phase change at the surface of a target and phase delay between the mixer and antenna. Each is expressed as:

$$\Delta\phi(t) = \phi(t) - \phi\left(t - \frac{2d_0}{c}\right), \quad 2.6$$

$$\theta = 2\pi f_0 t + \frac{4\pi d_0}{\lambda} + \theta_0. \quad 2.7$$

In a single channel receiver, the output signal from it will vary with respect to $\theta$ for a certain motion of x(t) and y(t). The sensor 10 can store values for $f_o$ and $\theta_o$. The change of the output signal with respect to $\theta$ eventually projects on the nominal distance $d_o$ between a person and the radar. When $\theta$ is an odd multiple of $\pi/2$, i.e., the subject is at optimum points, the ODS 100 can apply the small-angle approximation to equation 2.5, which will turn the equation into $$B_r(t) = \frac{4\pi x(t)}{\lambda} + \frac{4\pi y(t)}{\lambda} + \Delta\phi(t). \quad 2.8$$

As a first order approximation, the displacements associated with respiration and heart activity, x(t) and y(t) can be replaced by sinusoidal waves with corresponding frequencies and amplitudes. Hence, the base band signal $B_r(t)$ will become:

$$B_r(t) = A \sin 2\pi f_1 t + B \sin 2\pi f_2 t + \Delta\phi(t) \quad (2.9)$$

where $f_1$ is the frequency of respiration, $f_2$ the heartbeat frequency, A and B are corresponding amplitude, and $f_1 < f_2$, and $A \gg B$. This expression shows that the output signal is linearly proportional to the chest motion. Therefore, with appropriate filtering, information on the respiration and heartbeat can be obtained.

When θ is an integer multiple of n, i.e., the subject is at null points, the base band output data is in the form of:

$$B_r(t) \approx 1 - [A \sin 2\pi f_1 t + B \sin 2\pi f_2 t + \Delta\phi(t)]^2, \quad (2.10)$$

Which can be further expanded into the expression of:

$$B_r(t) \approx 1 - \frac{1}{2}[(A^2 + B^2) - A^2 \cos(4\pi f_1 t) - B^2 \cos(4\pi f_2 t) - 2AB \cos 2\pi (f_1 + f_2)t + 2AB \cos 2\pi (f_1 - f_2)t], \quad 2.11$$

by neglecting $\Delta\phi(t)$, if it is much smaller than the other components in the bracket.

As indicated by equation 2.10, the output signal is no longer linearly proportional to the displacement of the chest. Instead, it is proportional to the square of the chest movement and becomes much less sensitive to both respiration and heart motion. In addition to the reduced sensitivity, equation 2.11 suggests that frequency obtained in this way no longer reflects the real rate of the subject's movement. Depending on the magnitudes of A and B and bandwidth of the filter, the remaining information could include one or more of the following: the double of the original frequencies, the sum of the respiration and heartbeat frequencies, and the difference of them. Since the amplitude of respiration A is usually much greater than the one of heartbeat, double of the real respiration frequency will be expected to dominate in the spectrum after filtering is applied by the ODS 100.

When a subject is at a position between null and optimum points, the phenomenon can be complicated to describe with mathematical expressions. Therefore, simulation has been done with Matlab to study on how the position of the subject impacts the phase demodulated output of the occupancy sensor in this research. In simulation, the mathematical models are built with equation (2.5), using the two sinusoidal signals to represent the motion of respiration and heart. The respiration frequency is set at 0.25 Hz, and heartbeat 1.25 Hz. The Doppler radar signal frequency was set to 2.045 GHz, which is corresponding to the operation frequency of the sensor 10 in some embodiments. The nominal distance between the subject and the sensor was set at 1 m first, then decreased with $64^{th}$ of wavelength (λ/64) at the radar operation frequency at each step for total of 36 steps. This simulates the subject moving toward the sensor 10.

Figure 8A:
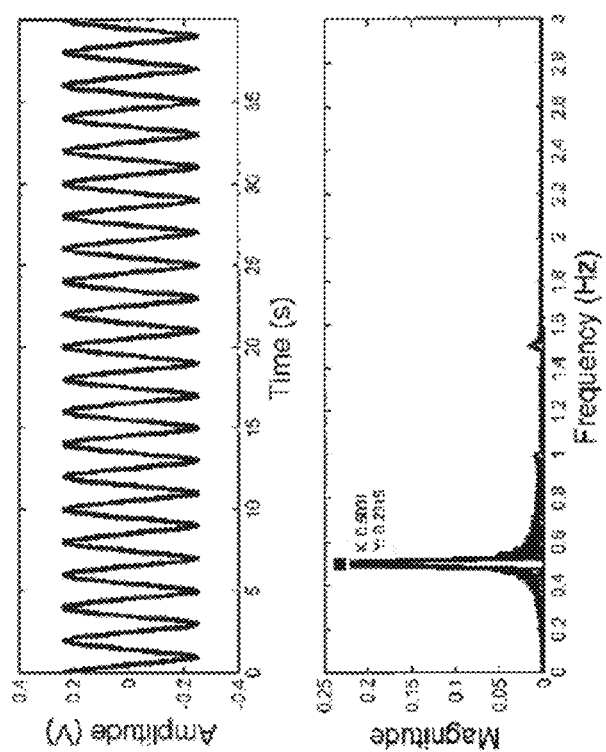
FIG. 8A illustrates simulation results on the amplitude of misinterpreted frequency at 0.5 Hz, with data shown in time domain (top) and frequency domain (bottom), at a nominal distance of 1 m (null point).
Figure 8B:
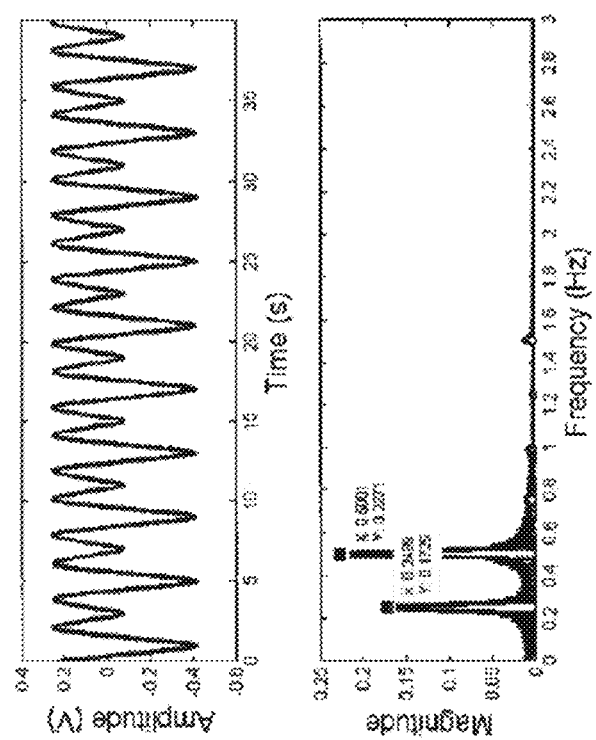
FIG. 8B illustrates simulation results on the amplitude of real motion frequency at 0.25 Hz and misinterpreted frequency at 0.5 Hz, with data shown in time domain (top) and frequency domain (bottom), at nominal distance of 1 m-$\lambda$/64.
Figure 8C:
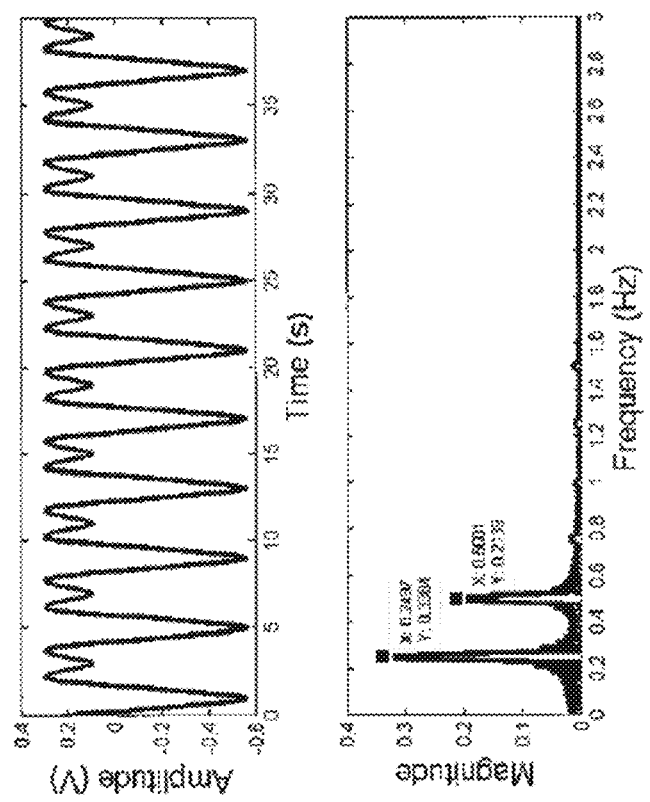
FIG. 8C illustrates simulation results on the amplitude of real motion frequency at 0.25 Hz and misinterpreted frequency at 0.5 Hz, with data shown in time domain (Top) and frequency domain (Bottom), at nominal distance of 1 m-2×$\lambda$/64.
Figure 8D:
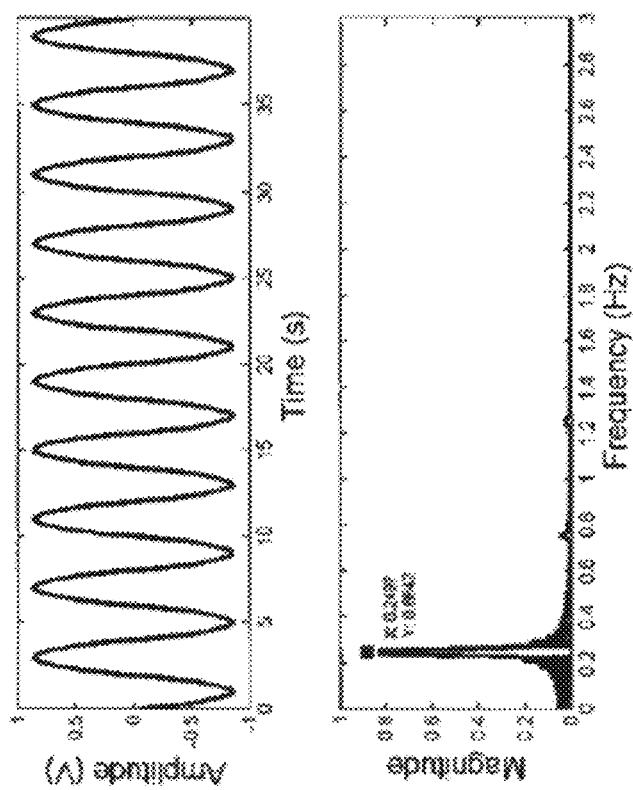
FIG. 8D illustrates simulation results on the amplitude of real motion frequency at 0.25 Hz, with data shown in time domain (Top) and frequency domain (Bottom), at nominal distance of 1 m-8×$\lambda$/64 (optimum point).
Figure 8E:
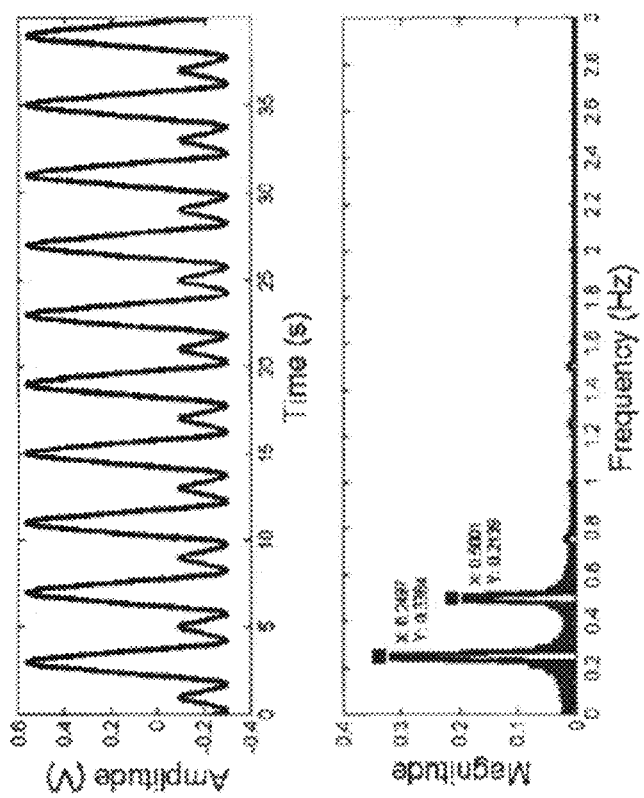
FIG. 8E illustrates simulation results on the amplitude of real motion frequency at 0.25 Hz and misinterpreted frequency at 0.5 Hz, with data shown in time domain (Top) and frequency domain (Bottom), at nominal distance of 1 m-14×$\lambda$/64.
Figure 8F:
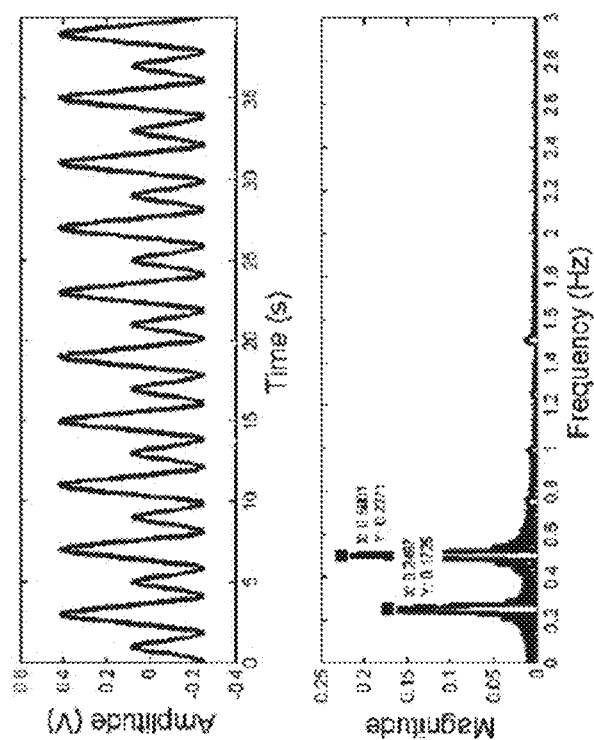
FIG. 8F illustrates simulation results on the amplitude of real motion frequency at 0.25 Hz and misinterpreted frequency at 0.5 Hz, with data shown in time domain (Top) and frequency domain (Bottom), at nominal distance of 1 m-15×$\lambda$/64.
Figure 8G:
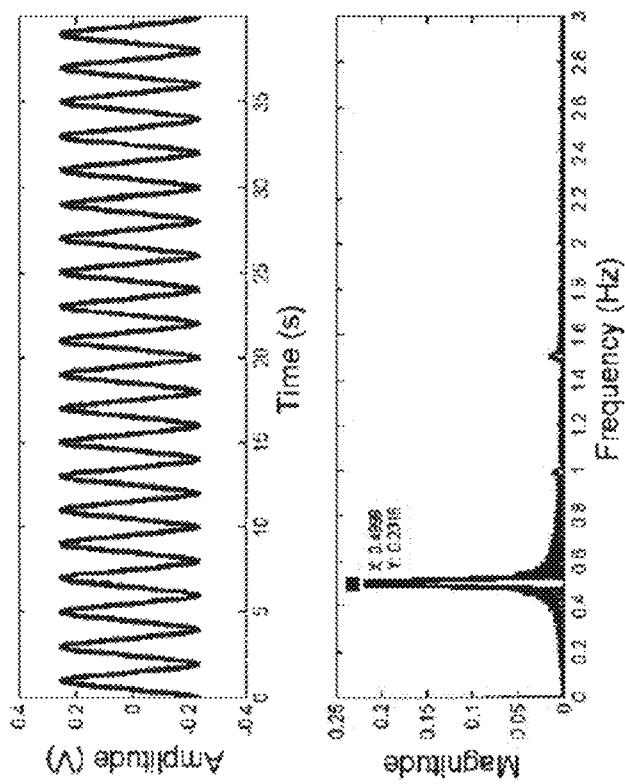
FIG. 8G illustrates simulation results on the amplitude of misinterpreted frequency at 0.5 Hz, with data shown in time domain (Top) and frequency domain (Bottom), at nominal distance of 1 m-16×$\lambda$/64 Null point.

The simulated results are presented in both time domain and frequency domain in FIG. 8A-FIG. 8G. In these figures, the top graphs show how the waveforms of the phase demodulated output change with the target nominal distance to the radar sensor in the time domain, and the bottom ones tell at which frequencies the corresponding peaks appear in the spectrum as the nominal position of the target varies. In FIG. 8A, there is a peak at the 0.5 Hz, double of the real simulated respiration rate. This means the target is at a null points. FIG. 8D indicates that the target is at an optimum point, since the dominant peak shows up at 0.25 Hz, the programmed respiration frequency. The distance between where the results in FIG. 8A and FIG. 8D show is λ/8, which further confirms the two position with these results above are null and optimum points, respectively. FIG. 8B and FIG. 8C show both peaks at programmed 0.25 Hz, and double of that frequency. The difference is the amplitude of these two peaks. In FIG. 8B, the amplitude of 0.25 Hz peak is lower than the one of 0.5 Hz. In FIG. 8C, the amplitude of 0.25 Hz peak increases, while the one of 0.5 Hz decreases, resulting in a higher peak at the 0.25 Hz compared to at a frequency of 0.5 Hz.

The position in FIG. 8C is λ/64 closer to the optimum point in FIG. 8D, than the position in FIG. 8B, or equally saying λ/64 farther to the null point in FIG. 8A. The results in FIG. 8A-FIG. 8D imply there is a connection between change in the amplitude of 0.25 Hz and 0.5 Hz peaks and the position relative to the null or optimum point. That is as the subject moves away from null point to optimum point, the amplitude of false frequency (0.5 Hz) peak decreases, while the amplitude of the real respiration frequency (0.25 Hz) increases, until no obvious 0.5 Hz peak is found in the spectrum, while 0.25 Hz reaches the highest value. Correspondingly, as the subject moves further from the null point and closer to the optimum point, the amplitude of the output signal in the time domain keeps increasing to the biggest value. Accordingly, there is an increase in sensitivity from the null point to the optimum point. Once the target from one null point reaches the optimum point, and continues to move beyond the optimum point in the same direction, the change of the amplitude of the signal in both time domain and frequency will be with the reverse tendency, since the target moves away from the optimum point to the next null point, as shown in FIG. 8A-FIG. 8G. Then the amplitude of the real motion frequency peak and the double (of the real one) frequency peak repeats as the target continues to get closer to the sensor.

Figure 8H:
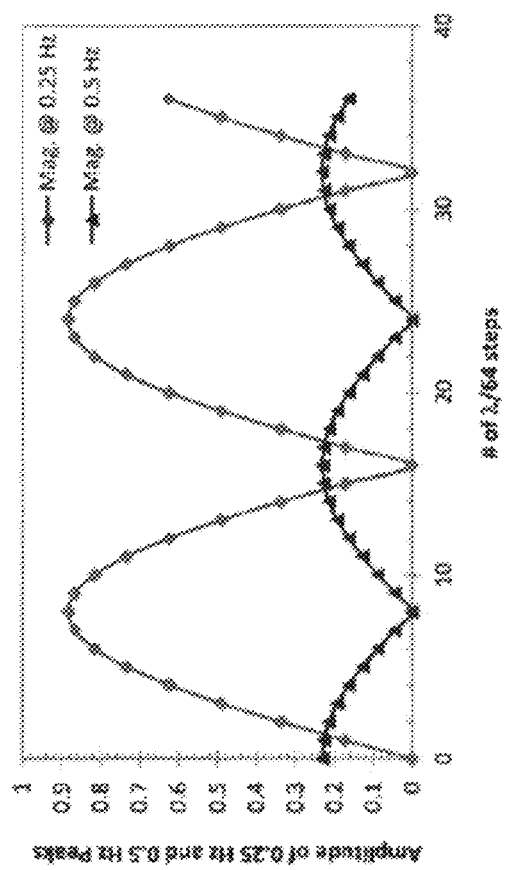
FIG. 8H illustrates amplitude of real motion frequency peak at 0.25 Hz and the one at 0.5 Hz changes with the position of the target tells where the target is relative to the null or optimum point.

The simulation results on the amplitude at the two frequency peaks and where these peaks appear in the number of λ/64 steps are summarized in FIG. 8B. Moreover, FIG. 8H illustrates that the optimum and null point are λ/8 apart, and they repeatedly appear every λ/4, respectively.

The following embodiment of a sensor 10 was used for testing. The sensor 10 included a CC2530 evaluation board and a passive sensor node which is composed of a 3-dB Minicircuits ZFSC-2-2500 power splitter, a Minicircuits ZFM4212 mixer, Two Antenna Specialist (ASPPT2988) antennae with 8 dBi gain and 60 degree E-plane beamwidth used for transmitter and receiver were located close to each other to provide strong coupling signal for LO port of the mixer. The mechanical target was placed 1.3 m from the sensor 10. Then the mechanical target was brought closer to the radar sensor by 36 of total incremental with $64^{th}$ of one wavelength at the operation frequency of 2.405 GHz for each step. At each new position, the mechanical target repeats the programmed movement. These same measurements can also be performed with humans. The sensor under test was operated at output power of 4.5 dBm for CW mode at each nominal position.

In the testing, the baseband signals were passed through Stanford Research System Model SR560 Low Noise Amplifiers for amplification and filtering. The mixer's output was amplified by a factor of 200, and subjected to 6 dB/octave low-pass filtering with cutoff frequency of 30 Hz. Finally, signals were recorded by a NI USB-6259 to the one or more hardware processors with the sampling rate of 100 Hz.

FIG. 8 shows where the peak of real motion frequency and its doubled frequency peak occur, and the amplitude of these two peaks normalized by the maximum value of real frequency peak. For comparison, the simulation data normalized to its maximum amplitude of 0.25 Hz peak is also included in this figure. The experiment data shows the measured oscillation frequency at 0.2568 Hz, very close to the programmed real motion frequency of 0.25 Hz. The locations where the measured double of real frequency peaks and its amplitude relative to 0.2568 Hz peak also follow the simulation closely, e.g. as the nominal position of the target is moving away from null point towards the optimum point, the amplitude of the real motion frequency peak increases, and the misinterpreted frequency at double decreases; while the nominal position of the target is getting closer towards null point from the optimum point, the amplitude of the real motion frequency peak decreases, and the misinterpreted frequency at double increases. The maximum amplitude of the real motion frequency peak presents with the minimal value of the double of it where the target is at optimum points, and vice versa where the target is at null points. The optimum and null points are $\lambda/8$ apart, and they repeat themselves every quarter wavelength.

Figure 10A:
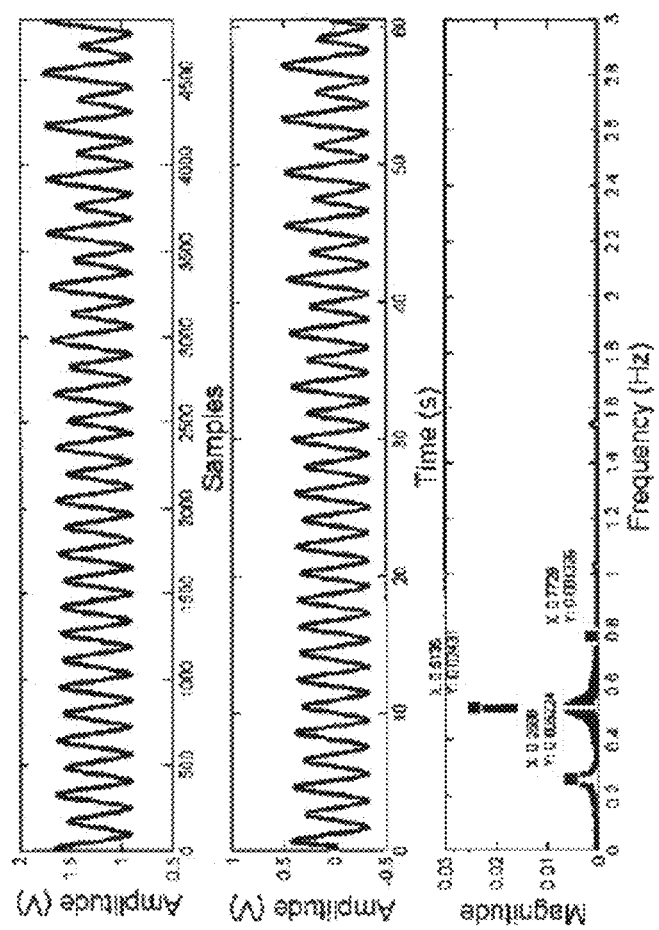
FIG. 10A illustrates experimental results on the impact of subject location on phase demodulated sensor output, with raw data shown in time domain (Top), filtered data shown in the time domain (Middle) and data in frequency domain (Bottom), at a null point.
Figure 10B:
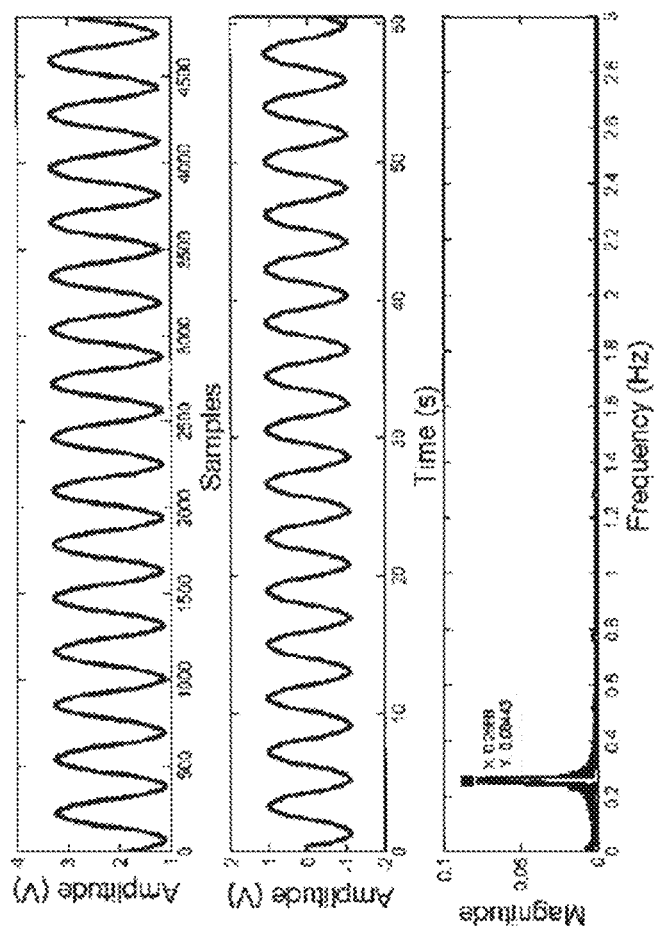
FIG. 10B illustrates experimental results on the impact of subject location on phase demodulated sensor output, with raw data shown in time domain (Top), filtered data shown in the time domain (Middle) and data in frequency domain (Bottom), at an optimum point.
Figure 10C:
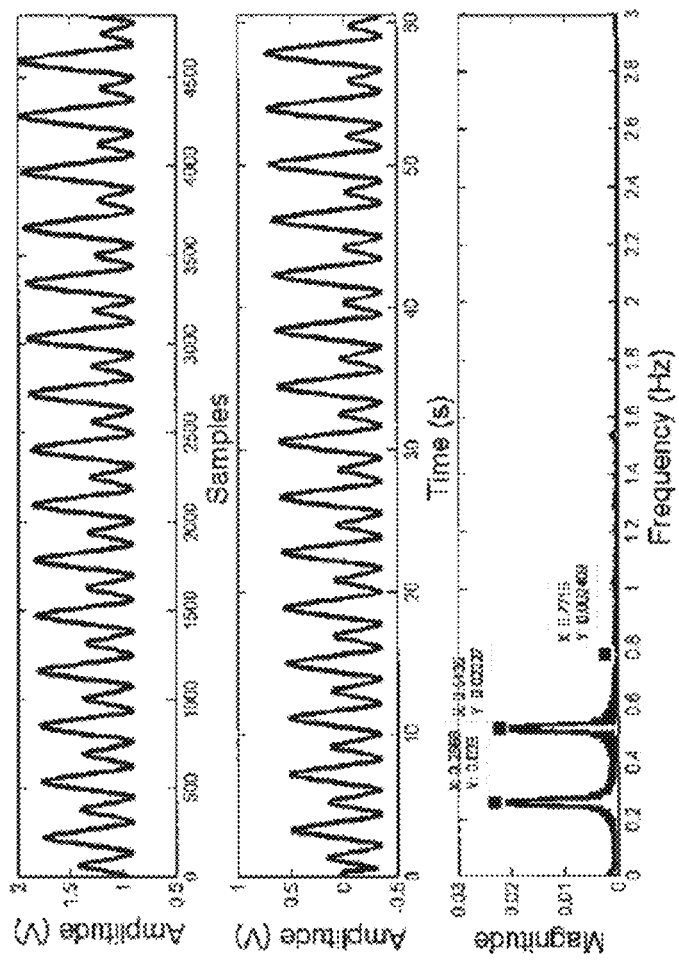
FIG. 10C illustrates experimental results on the impact of subject location on phase demodulated sensor output, with raw data shown in time domain (Top), filtered data shown in the time domain (Middle) and data in frequency domain (Bottom), at a point between a null point and an optimum point.

FIG. 10A-FIG. 10C show the detailed information in the time domain and frequency domain for the typical data set at the null point, optimum point and between. At the null point, 0.5136 Hz peak dominates. At the optimum point, the real motion frequency at 0.2568 Hz dominates. In between, both peaks appear. Which of the peaks is higher depends on the target position relative to the null or optimum points.

Both simulation and experimental results suggest that though the sensitivity and the extracted motion frequency vary with the target position, either the peak representing the real motion frequency or the peak at the double of the real one or both will appear in the spectrum after appropriate filtering. The ODS 100 can detect the peaks and use it as a baseline for the detection.

Human respiration and heart beat are not necessarily in the form of sinusoidal wave. Accordingly, the ODS 100 can use a model for respiration and heart beat signals. An idealized chest motion due to respiration can be modeled with a sinusoidal half-cycle with rounded cusp:

$$p_R(t) = \sin^p \pi f_R t, \qquad 2.12$$

where $f_R$ is respiratory frequency and p controls the rounding of the cusp and the general shape of the signal. Modeling respiratory signals with raised sinusoid has prolonged and narrow halves which are closer to real respiratory signals detected by radar. The ODS 100 can implement the above models and equations to detect occupancy from the received radio signals.

The heart signal can be modeled with an analog pulse of an exponential $e^{t/\tau}$ with time constant t, filtered by a critically damped second-order Butterworth filter with cutoff frequency $f_o$. The pulse shape repeats at $1/f_H$ with heartbeat frequency $f_H$. This model has been developed based on the fact of discharging heart ventricles during the systolic phase generates impulsive motion that is subsequently filtered by the bone and tissue to chest wall where radar senses the motion. The resulting characteristic pulse shape is expressed as:

$$p_H(t) = e^{t/\tau} + \left[\left(\frac{\sqrt{2}}{\omega_0 \tau} - 1\right) \sin \frac{\omega_0 t}{\sqrt{2}} - \cos \frac{\omega_0 t}{\sqrt{2}}\right] e^{-\omega_0 t/\sqrt{2}}.$$

In an example simulation of chest movement, a total of 4000 samples (40 s) were generated at a sampling rate of 100 Hz. The peak-to-peak amplitude of heartbeat signal is 3% of the one for respiration (AR=1). The heart rate is $f_H$ 1.25 Hz and the respiration rate is $f_R$ 0.25 Hz. The other parameters, $\tau=0.05$, $f_o=1$ Hz, and p=3 are chosen to best present typical real data.

Figure 9:
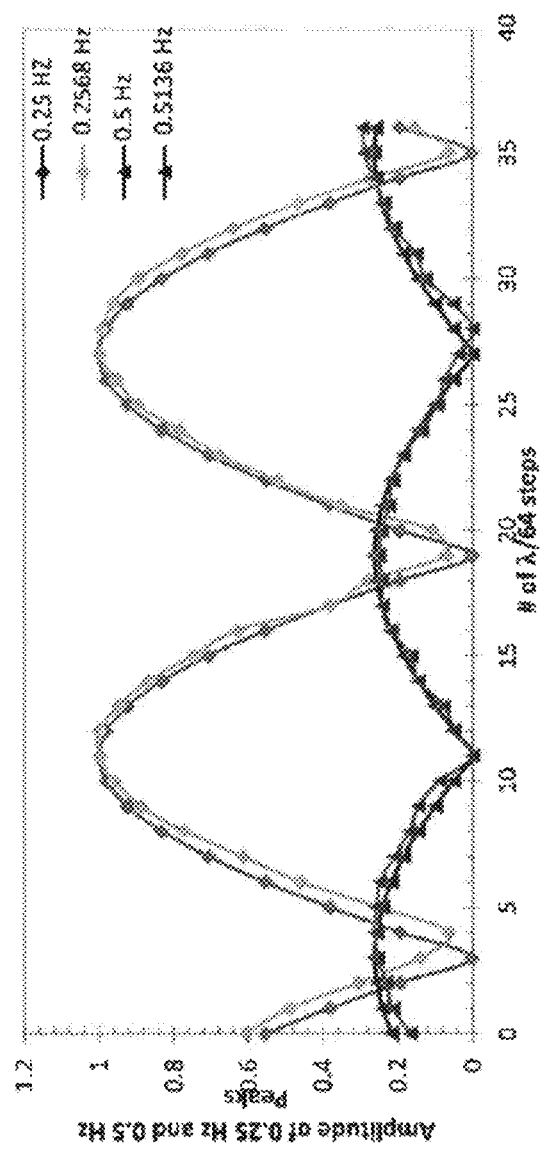
FIG. 9 illustrates comparison between simulation and experiment data for the position impact on the phase demodulated sensor output.
Figure 11A:
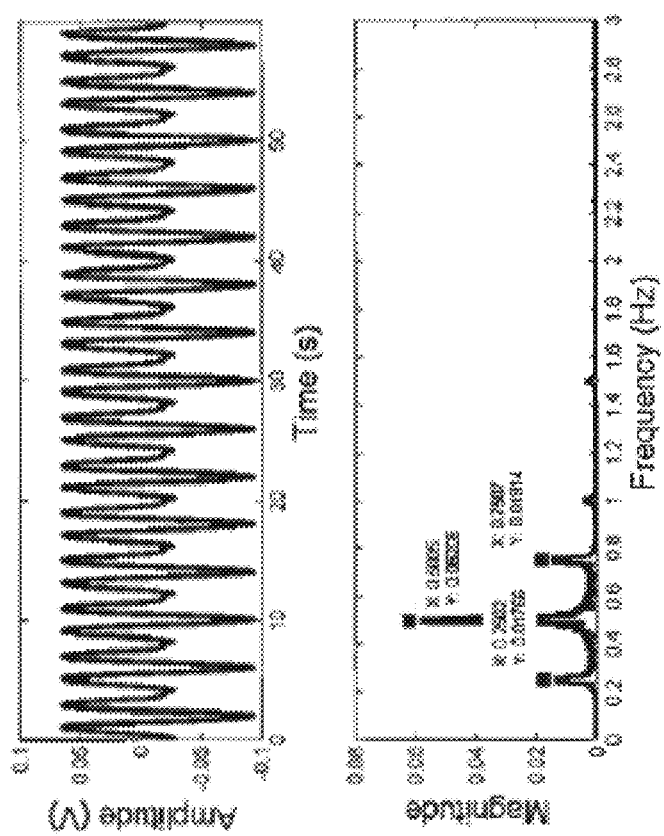
FIG. 11A illustrates simulation results on the impact of subject location on demodulated output, with demodulated data shown in time domain (Top), and frequency domain (Bottom), at the distance of 1 m (null point).
Figure 11B:
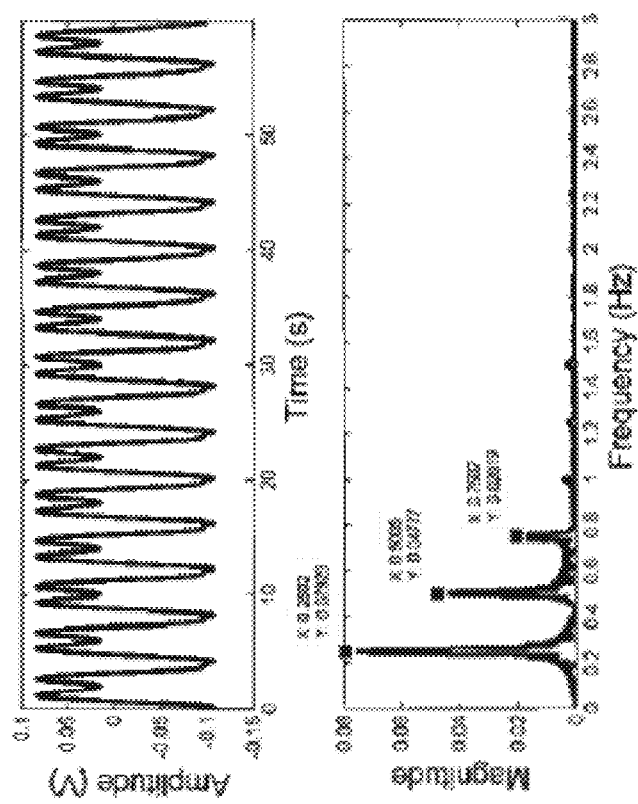
FIG. 11B illustrates simulation results on the impact of subject location on demodulated output, with demodulated data shown in time domain (Top) and frequency domain (Bottom), at incremental nominal distance of 1 m-$\lambda$/64.
Figure 11C:
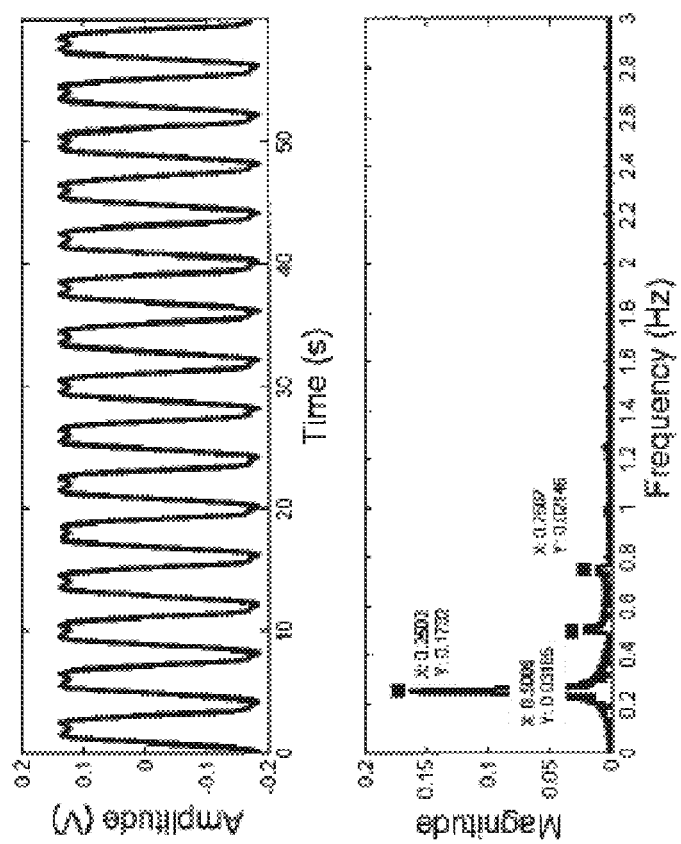
FIG. 11C illustrates simulation results on the impact of subject location on demodulated output, with demodulated data shown in time domain (Top) and frequency domain (Bottom), at the nominal distance of 1 m-2×$\lambda$/64.
Figure 11D:
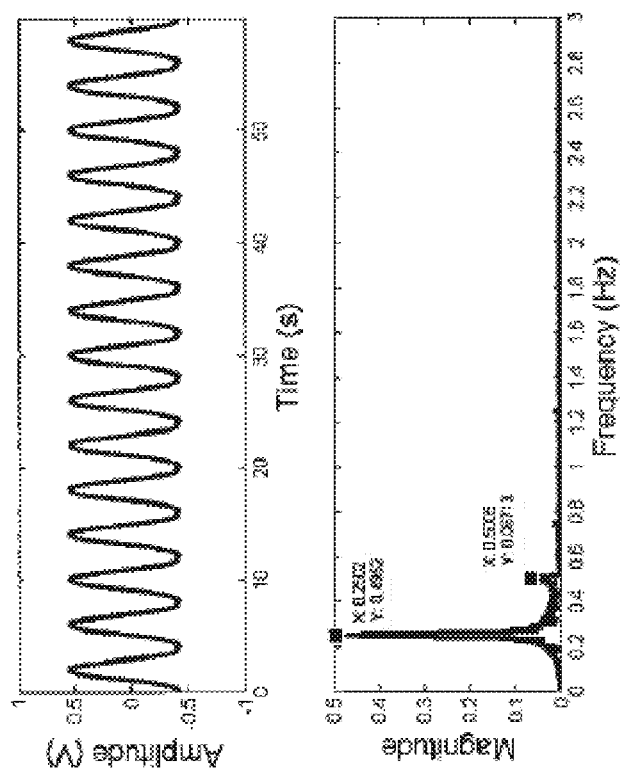
FIG. 11D illustrates simulation results on the impact of subject location on demodulated output, with demodulated data shown in time domain (Top) and frequency domain (Bottom), at incremental nominal distance of 1 m-8×$\lambda$/64 (optimum point).
Figure 11E:
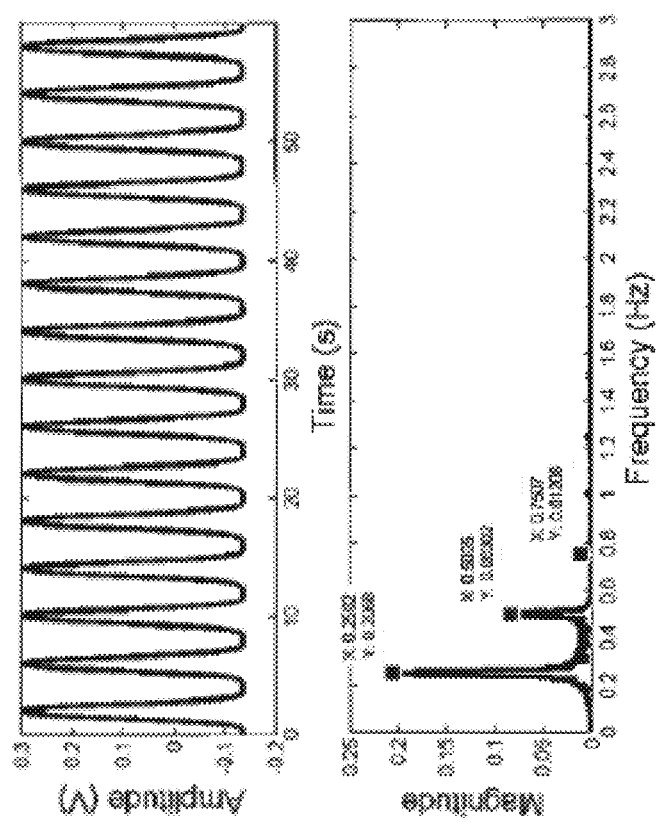
FIG. 11E illustrates simulation results on the impact of subject location on demodulated output, with demodulated data shown in time domain (Top) and frequency domain (Bottom), at the nominal distance of 1 m-14×$\lambda$/64.
Figure 11F:
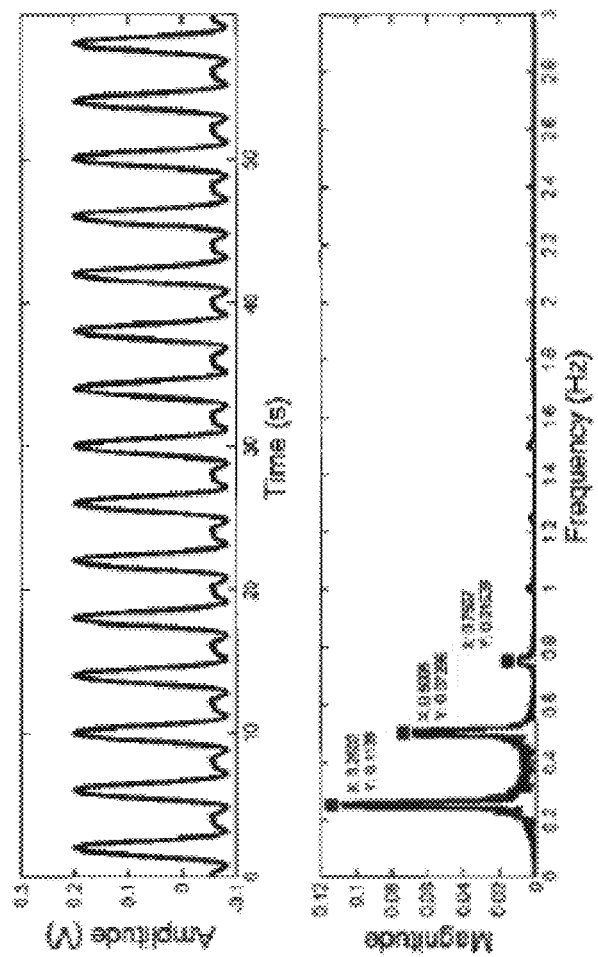
FIG. 11F illustrates simulation results on the impact of subject location on demodulated output, with demodulated data shown in time domain (Top) and frequency domain (Bottom), at incremental nominal distance of 1 m-15×$\lambda$/64.
Figure 11G:
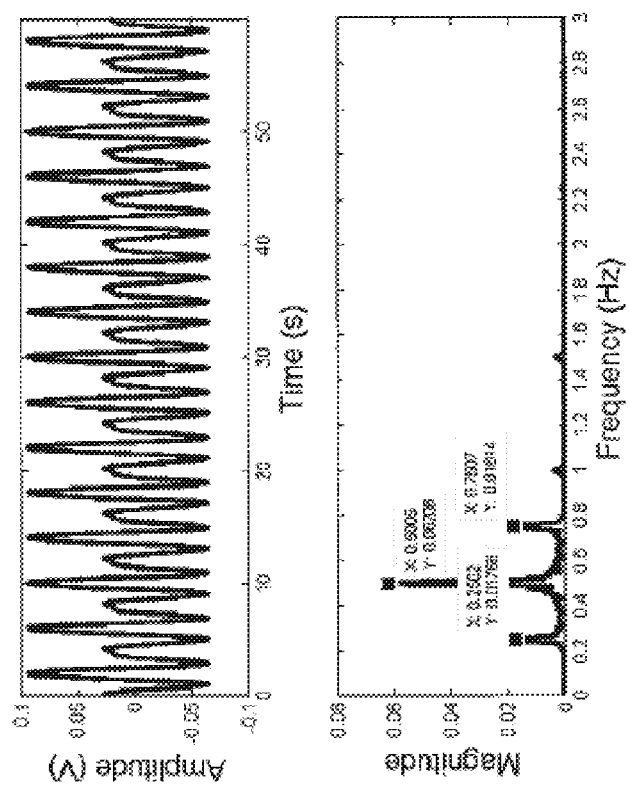
FIG. 11G illustrates simulation results on the impact of subject location on demodulated output, with demodulated data shown in time domain (Top) and frequency domain (Bottom), at incremental nominal distance of 1 m-16×$\lambda$/64 (null point).
Figure 12:
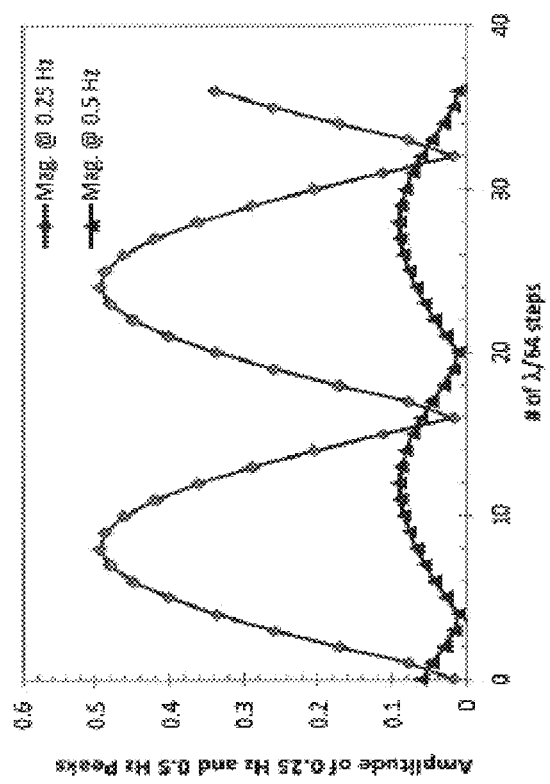
FIG. 12 illustrates amplitude of real motion frequency peak at 0.25 Hz and the one at 0.5 Hz changes with the position of the target tells where the target is relative to the null or optimum point.

Using the test signal, how the subject location affects the demodulated output data is examined. The CW radar signal with frequency of 2.045 GHz, sample frequency 100 Hz, and nominal distances from 1 m to $36 \times \lambda/64$ closer to the radar than 1 m with $\lambda/64$ incremental at each step were used in the simulation. FIGS. 11A-11G show the time domain and frequency domain patterns of the output signal from null point to optimum point. FIG. 11A shows that the subject is at the null point where the extracted respiration frequency is at 0.5 Hz, the double of the preset real one at 0.25 Hz. Also there are very small peaks at fundamental frequency and third harmonic. As the nominal distance decreases, the subject moves away from null point to optimum point. The amplitude of misrepresenting 0.5 Hz peak decreases, while the amplitude of the real respiration frequency increases, until no obvious 0.5 Hz peak is found in the spectrum and 0.25 Hz reaches the highest value. Also, as the subject moves further from the null point and closer to the optimum point, the amplitude of the output signal in the time domain keeps increasing to the biggest value. Once the target passes the first optimum point, the opposite tendency on the change in amplitude of the peaks of 0.5 Hz and 0.25 Hz was observed in frequency domain, and the amplitude of output data in the time domain gradually decreases until it reaches the lowest value, since the distance between the target and the optimum point increases as the subject moves closer to the next null point. The amplitude variation of each peak with the position is summarized in FIG. 12, which shows the similar pattern as in FIG. 9. However, in FIG. 12, the occurrence of crest of 0.25 Hz is not accompanied with the valley of 0.5 Hz. This is due to the model itself having relative strong harmonics. Therefore, where the double of real motion frequency shows up is affected by both the target position relative to null or optimum points and 2nd harmonic of the signal itself.

Figure 13:
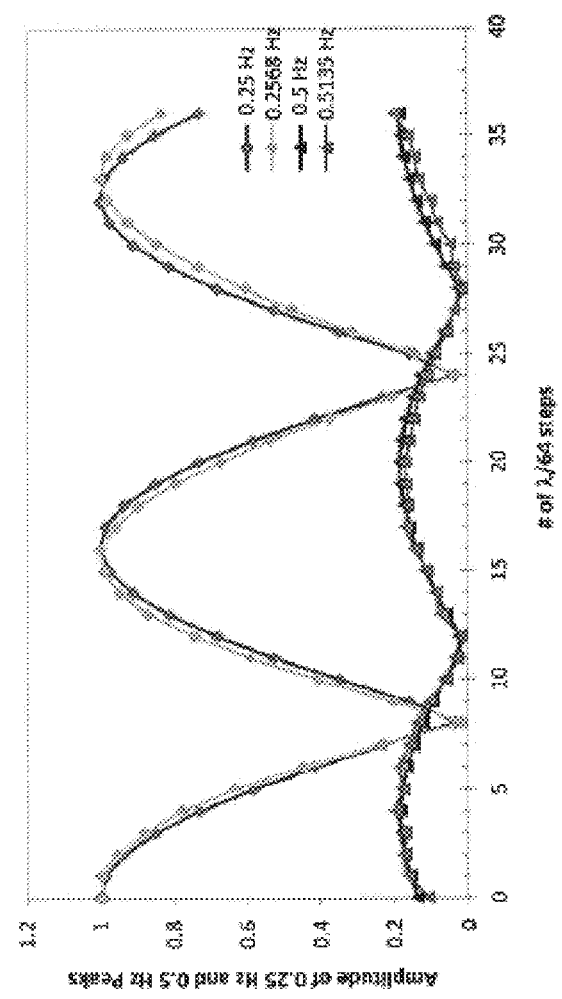
FIG. 13 illustrates a comparison between simulation and experiment data.
Figure 14A:
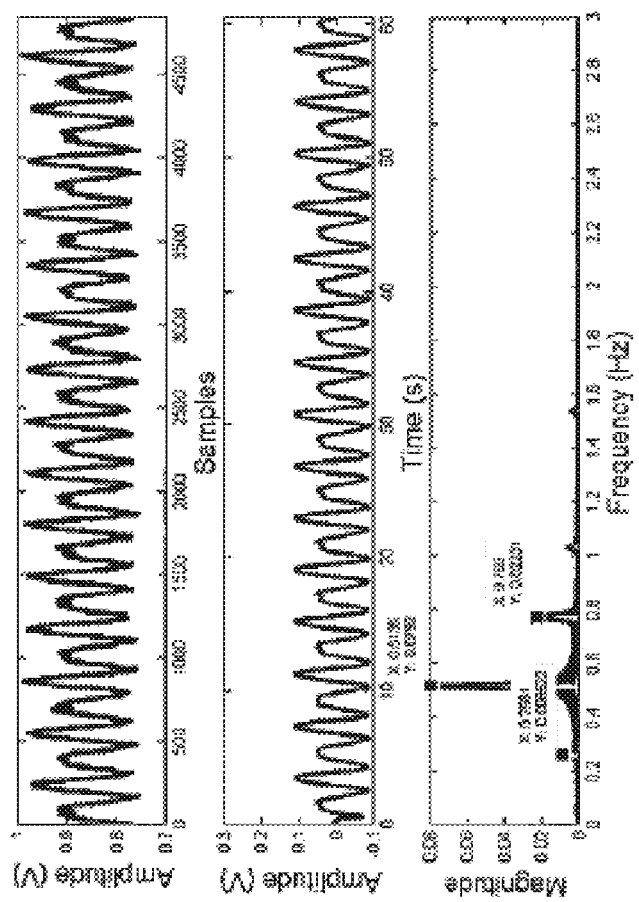
FIG. 14A illustrates experimental results on the impact of subject location on phase demodulated sensor output, with raw data shown in time domain (Top), filtered data shown in time domain (Middle) and data in frequency domain (Bottom), at a null point.
Figure 14B:
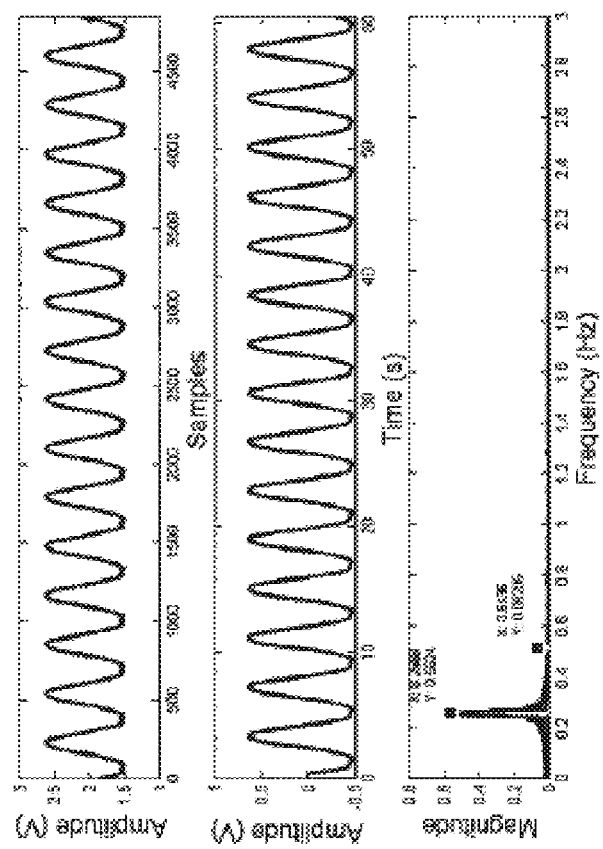
FIG. 14B illustrates experimental results on the impact of subject location on phase demodulated sensor output, with raw data shown in time domain (Top), filtered data shown in time domain (Middle) and data in frequency domain (Bottom), at an optimum point.
Figure 14C:
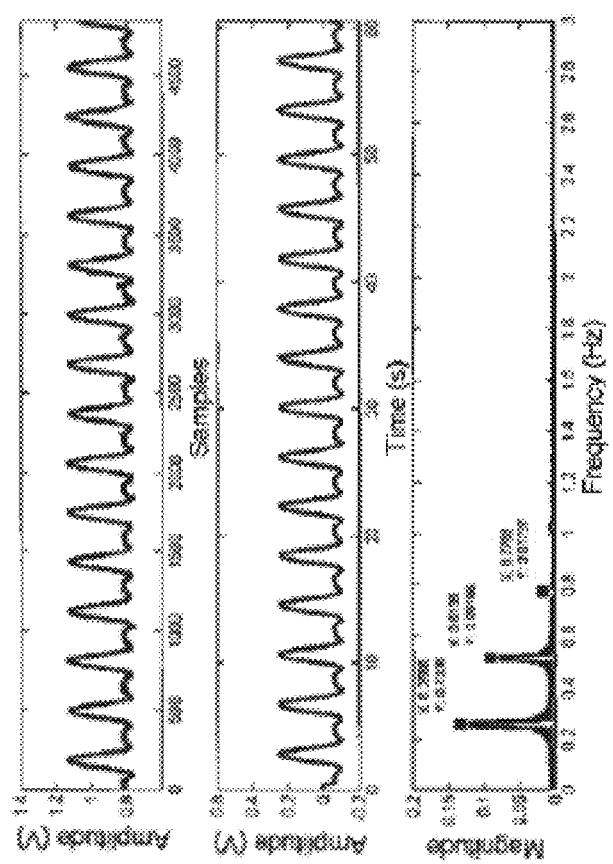
FIG. 14C illustrates experimental results on the impact of subject location on phase demodulated sensor output, with raw data shown in time domain (Top), filtered data shown in time domain (Middle) and data in frequency domain (Bottom), in between a null point and an optimum point.

In the following, a series of trials are conducted to confirm the models expressed by Equations (2.12) and (2.13). The mechanical target in this trial moves along the contour programmed with the sum of these more realistic models, instead of the sinusoidal signals. The motion frequencies are: 1.25 Hz for heart beat and 0.25 Hz for respiration. FIG. 13 summarizes with the experiment data where the peaks of real frequency and double of that occur, and how big the amplitude is relative to the null or optimum positions. It also compares the measurement and simulation results by normalizing the data at each point to the maximum amplitude of real frequency peak in measurement and simulation, respectively. With the more complex but more realistic models, the occupancy sensor can accurately measure the respiration frequency at 0.2568 Hz at optimum points, which is same as the one obtained with sinusoidal models, and very similar to the programmed 0.25 Hz. The pattern with experiment data follows the simulated one closely, which proves the simulation result is correct. FIG. 14A-FIG. 14C show the information in the time domain and frequency domain for the typical data set at the null point, optimum point and between.

The experiment and simulation with complex models repeat the result that is obtained with the sinusoidal model. It confirms that although at the null point, the moving rate of a target could be misrepresented with the proposed occupancy sensor when a single channel receiver is used, the uncorrected frequency was the double of the real one. Depending on where is the target relative to the null or optimum point, either one of the two frequency peaks or both will be observed in the spectrum analysis. The ODS 100 can use these observations as stored models for occupancy detection.

The simulation and experimental results discussed above reveal the range where the subject is closer to the optimum points, the output data from the Doppler radar occupancy sensor built in this dissertation can keep the information in the original signal, and as the subject leaves further from the optimum points, i.e., approaches closer to the null points, the extracted information from the output of the sensor will be deviated from the original one, including decreased sensitivity and misinterpreted motion rate. However, the incorrect frequency peak appears at the double of the real one, either alone or with the real peak, depending how far or how close the subject is to the null or optimum points. Due to the human respiration frequency range is usually in 0.1-0.8 Hz, the ODS 100 can search for the peaks between 0.1-1.6 Hz as the occupancy detection baseline. In some embodiments, to improve the efficiency, the ODS 100 can scan the frequency between 0.1-0.8 Hz first, and if it finds nothing, then expand the searching scope to 0.8-1.6 Hz for second harmonic.

Figure 15:
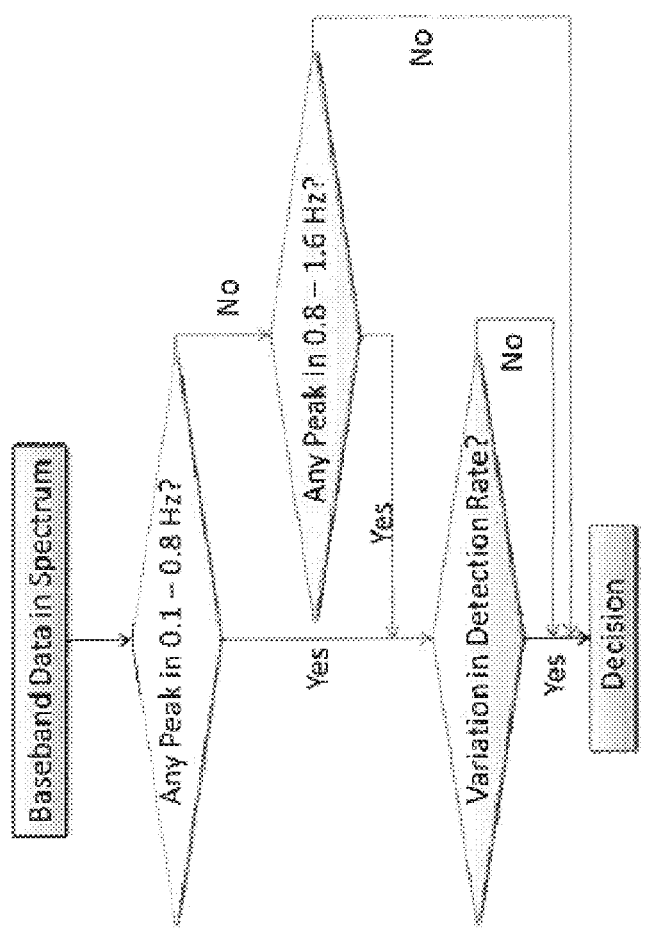
FIG. 15 illustrates a flow chart of a process for detection of human presence according to an embodiment of the present disclosure.

To extract the inherent variability in the respiration rate, a windowed method may be used by the ODS 100. The short time Fourier transform method divides the data into chunks of proper length (windows), calculates the FFT of each window of data, averages the FFT over multiple windows to yield a representation of Power Spectral Density (PSD) of a segment of data and ultimately finds the peak in the PSD. The window length is determined depending on the application. Generally, the length of the window correlates to 5 to 10 periods of the signal. This results in a 10 to 18 s window length for respiration due to its low frequency nature. The overall flow chart of a process for occupancy detection using the base frequency and second harmonic is illustrated in FIG. 15. The variation can correspond to RMSE values as discussed above with respect to FIG. 4C.

Testing with Humans

An embodiment of a sensor 10 was used to test occupancy detection with people in an area of coverage. In this embodiment, the sensor 10 is assembled with CC2530 evaluation board, passive sensor node, transmit and receive antennae, and other laboratory equipment and off-the-shelf coaxial components. The testing was conducted at Channel 11 with center frequency 2.405 GHz for both CW and packet modes. The transmitted power was programmed to be 4.5 dBm. The subjects were seated at a distance of 1.2 meters away from the sensor.

The RF transmitter on CC2530 generates a radio signal, which can be phase modulated by the cardiopulmonary activities of the subject after it incidents on and is reflected by the human body. The passive sensor node, constructed with an Antenna Specialist (ASPPT2988) receive antenna, a Minicircuits splitter (ZFSC-2-2500) and mixer (ZFM4212), converts the sum of air-coupled transmitted and reflected signals to the base band output, which was fed into Stanford Research System Model SR560 Low Noise Amplifiers for amplification and filtering, and then digitized with a NI USB-6259 data acquisition device. The base band output is amplified by a factor of 200, and subjected to 6 dB/octave low-pass filtering at 30 Hz for CW mode, and 1 kHz for packet mode. Finally, signals out of DAQ are recorded by a NI USB-6259 to a computing system including one or more hardware processors with the sampling rate of 120 Hz for CW mode and 3 kHz for packet.

In this embodiment, the data was cleaned with FIR low pass filtering first for CW mode. The motion rate of the mechanical target was then calculated by applying FFT to the filtered data. For packet mode data, the ODS 100 can apply signal processing algorithms to calculate the motion rate of the subject, i.e., low pass filtering, local maximum detection, cubic spline interpolation, and FFT.

Figure 16A:
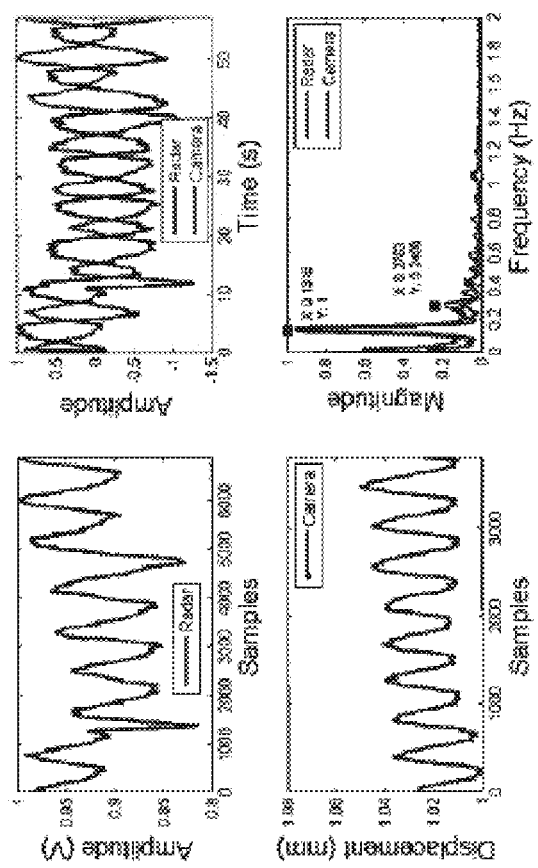
FIG. 16A illustrates CW Data from Subject #16 where the top left trace is the occupancy sensor raw data, the bottom left trace is IR camera raw data, the top right trace is the comparison between sensor and camera after filtering and normalization, and the bottom right trace is the frequency spectrum after FFT.
Figure 16B:
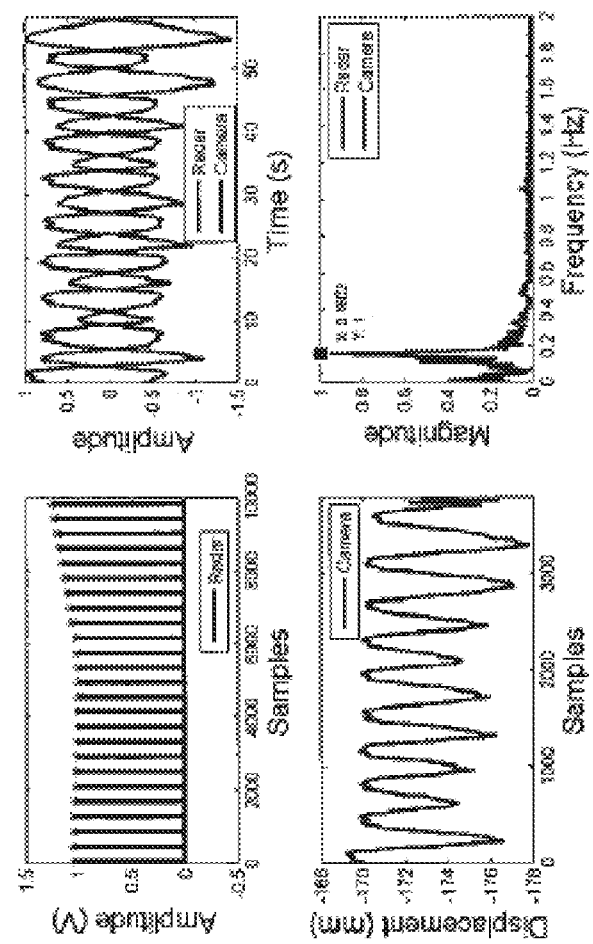
FIG. 16B illustrates packet mode Data from Subject #16 where the top left trace is the occupancy sensor raw data (only show 10000 samples), the bottom left trace is IR camera raw data, the top right trace is the comparison between sensor and camera after filtering and normalization, and the bottom right trace is the frequency spectrum after FFT.

The data collected from a subject is shown in FIG. 16A for CW operation mode and FIG. 16B for packet operation mode, as an example to show the test result in time and frequency domain. Since the camera measures the displacement directly, different from the radar measurement, for comparison purpose, both raw data were normalized to their maximum measured value. For CW mode, a dominant frequency at 0.13 Hz and its second harmonic were found in the preset searching frequency range of 0.1-1.6 Hz. For packet mode, only one peak appears at 0.16 Hz. The frequency domain results match with each other very well. The radar detects the movement of broader area than the camera. Therefore, it is reasonable that there is phase discrepancy between radar and reference.

Figure 17A:
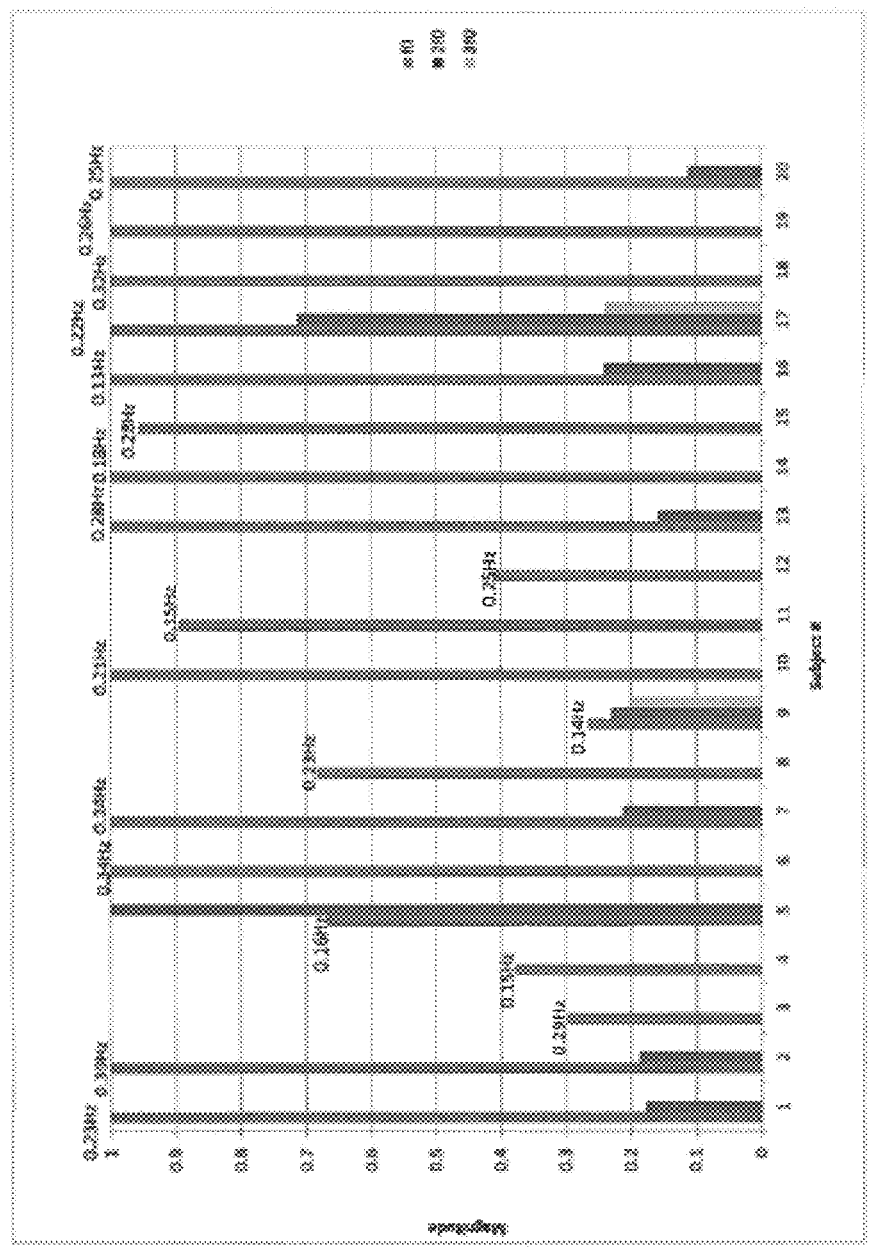
FIG. 17A illustrates detected dominant frequency and its harmonics for respiration of subject #1-20 at CW mode.
Figure 17B:
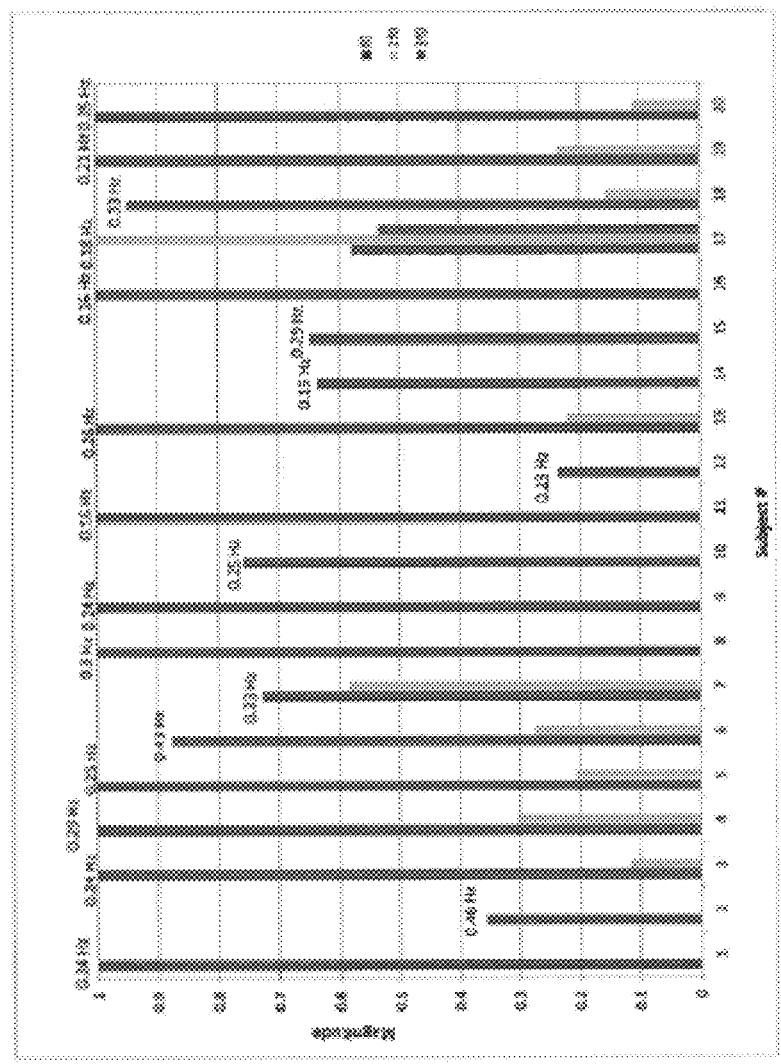
FIG. 17B illustrates detected dominant frequency and its harmonics for respiration of subject #1-20 at packet mode.
Figure 17C:
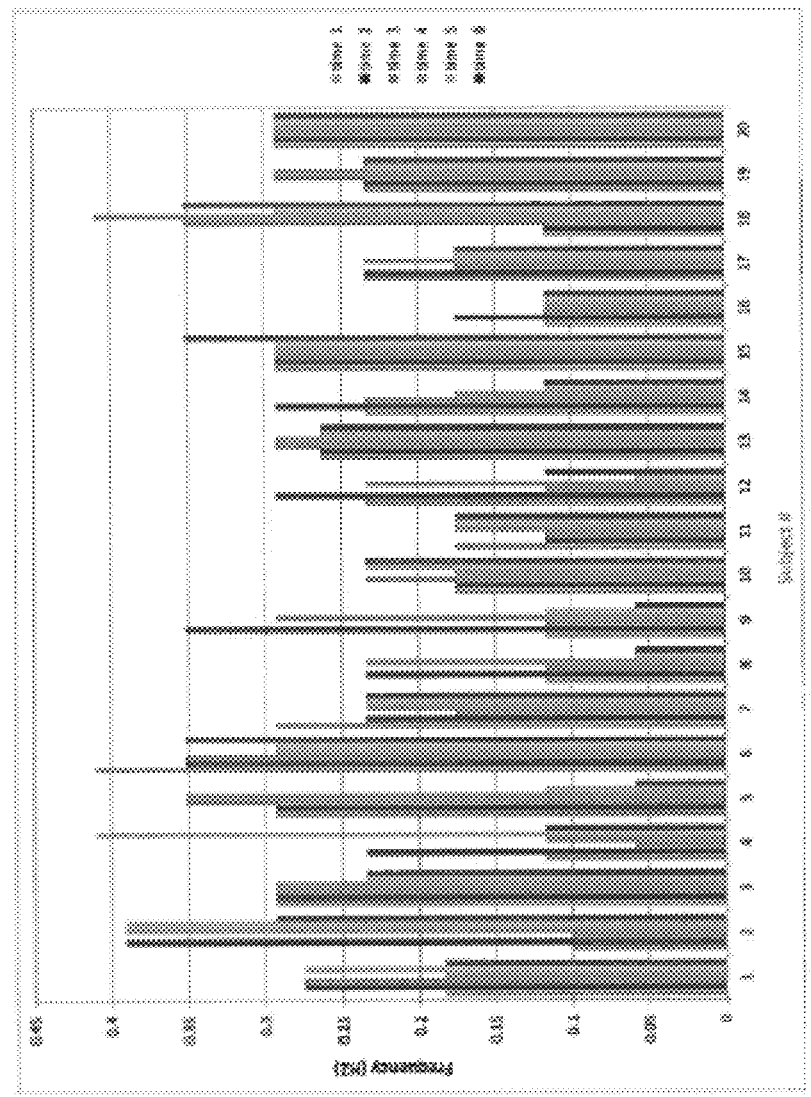
FIG. 17C illustrates detected respiration rate vs. time for subject #1-20 at CW mode.
Figure 17D:
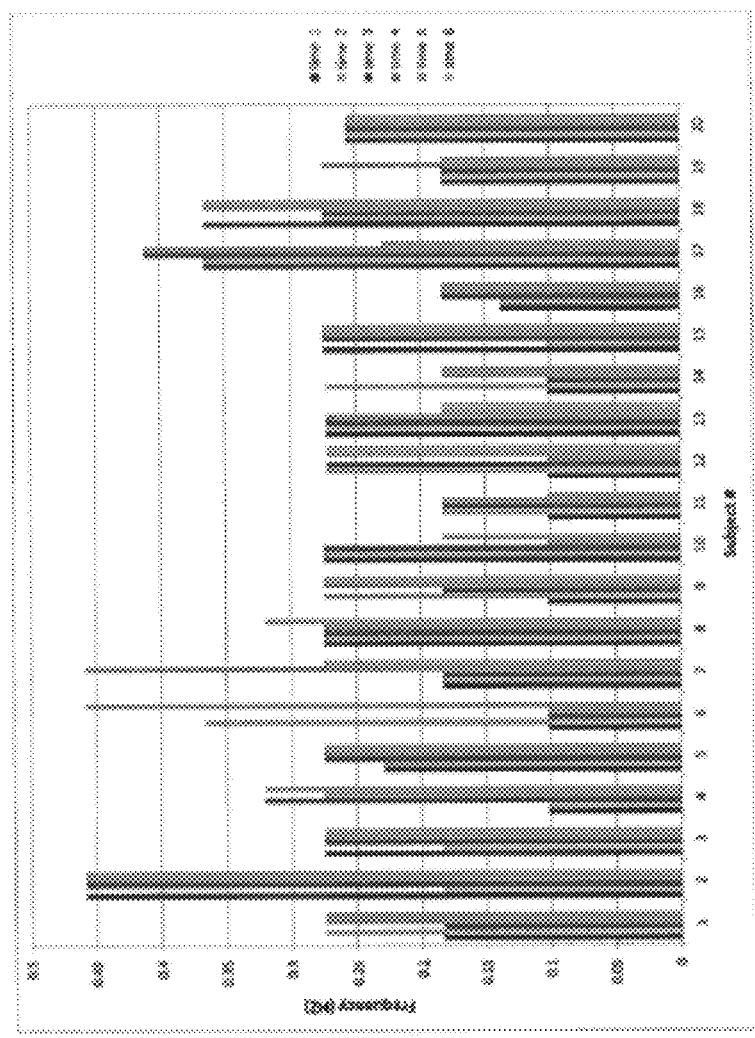
FIG. 17D illustrates detected respiration rate vs. time for subject #1-20 at packet mode.

The testing results are summarized in FIG. 17A through FIG. 17D. The frequencies of the dominant peaks and their harmonics for each subject are presented in FIG. 17A and FIG. 17B when the occupancy sensor is operated with CW mode and packet mode, respectively. Both figures indicate that all the detected dominant respiration frequencies fall into the range of 0.1-0.8 Hz. Some of the dominant peaks are accompanied with second harmonics. According to what is observed in FIG. 17A and FIG. 17B, the ODS 100 can make a preliminary determination that a human presence is detected. However, to further exclude the interference of the periodic mechanic movement, the ODS 100 can verify time-varying respiration. The ODS 100 can perform FFT analysis of the collected baseband data in a window size of 10 s. In some embodiments, where tracking the respiration rate with continuous time in medical application is not required, the ODS 100 uses segment windows, not the continuous sliding windows to calculate the FFT. The results for CW operation and packet mode are illustrated in FIG. 17C and FIG. 17D, individually, which confirm the preliminary judgment of human presence. As a comparison, the testing results on the mechanical target (subject #20) is also included in these figures. Although it is programmed to oscillate at 0.25 Hz on purpose, its constant value of rate with the time can exclude the possibility of false positive alarm.

Probing Angle of Antenna

In some embodiments of the sensor 10, the transmitter 12 includes an antenna that is oriented at an angle with respect to a surface, such as the wall or antenna mounting board. When the receiver 14 shares the same antenna, the receiving antenna will also be at an angle. In some embodiments, if separate antennas are used, both the transmitting and receiving antennas may be oriented at an angle with respect to a perpendicular surface.

Physiological monitoring including respiratory rate, cardiopulmonary volumes estimation and even chest wall displacement measurement are associated with chest wall mechanics. A perpendicularly probing antenna can target radio waves to the upper area of the torso. However, normal breathing does not necessarily create an anterior-posterior motion on the chest, rather an upward movement. The return signal from the thoracic wall is likely to vary due to respiratory effort. Therefore, the accuracy of vital signs detection by probing the radar perpendicularly to the chest may be degraded.

Accordingly, it may be important to understand chest wall expansion angle to identify the probing angle of the antenna in the sensor 10. A probing angle compensation method is discussed below to acquire better estimation accuracy with a Doppler radar. The term respiratory angle is defined with physiological analysis. Compensation can then be conducted and measurement results show that Doppler radar outputs were enhanced, indicating higher amplitude and signal to noise ratio.

Medical research has shown that the movement of the sides of the thoracic wall resembles the movement of a bucket handle, and the sternum a pump handle. The movement of the sternum during respirations shows both superior and anterior characteristics. Therefore, the combination of these movements allows the rib cage to increase in the anterior-posterior and transverse diameters, and during expiration the ribs will move down and medially. These distortions lead to an angle between the path of a test point on sternum where maximum displacement occurs during respiration and a perpendicular line of chest wall on that point when inhalation starts. In an embodiment, the angle can be referred to as respiratory angle. FIG. 18 illustrates modeling of a chest wall angle during respiration. The angle α lies between the path of a test point located on sternum during respiration and the perpendicular line of chest wall on that point when inhalation starts.

To study the behavior of chest wall, a high precision motion tracking system can be used. The Advanced Real-time Tracking (ART) System relies on a pair of infrared cameras for three-dimensional motion capture under a stereo vision. The configuration of the cameras provides a large working space without sacrificing the camera's ability to detect passive retroreflective markers. The system needs calibration beforehand in order to create a room coordinate system, in which the origin is set. The output of the system is three-dimensional location coordinates of the marker under tracking.

To determine the desired respiratory angle, six markers were attached to the sternum of the probing subject, with approximately the same distance apart from each other. The goal was to model the distortion of the sternum from top to bottom. Considering motion artifact, the top marker is applied on manubrium bone, directly above the body of the sternum. The motion tracked by it can be caused by body posture but not tidal breathing. Therefore, the displacement obtained from it can be used for body motion cancellation and normalization purposes. It was found out that the marker at the bottom of the sternum creates maximum displacement at inhalation ending, thus it can be used for desired angle estimation.

Figure 18B:
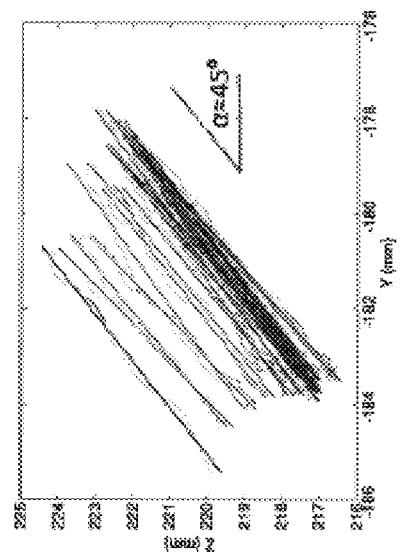
FIG. 18B illustrates a sample marker profile (grey) during respiration presents a consistence in respiratory angles during respiration on sagittal plane.
Figure 18A:
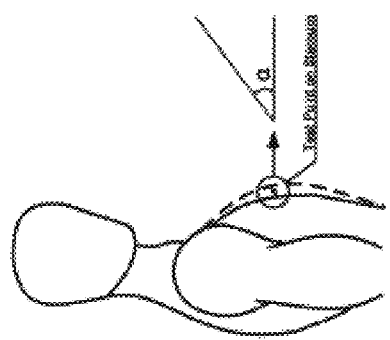
FIG. 18A is an illustration of modeling chest wall angle during respiration.

FIG. 18A is an illustration of modeling chest wall angle during respiration. The angle α lies between the path of a test point located on sternum during respiration and the perpendicular line of chest wall on that point when inhalation starts. FIG. 18B illustrates a sample marker's movement profile as reconstructed on the sagittal plane, from marker coordinates on anterior-posterior axis Y and superior-inferior axis Z. It shows a consistence in respiratory angles while breathing in and out. Calculation of the respiratory angle can be accomplished by finding the angle between linear regression fitted line to the respiratory profile and axis Y. Due to the fact that respiratory profile within one travel drifts from time to time, it can be segmented into individual respiratory cycles for linear fitting. The slopes of fitted lines yield the respiratory angles, which are averaged to the desired angle. The desired angle was averaged from ten experiments on the same subject during normal breathing, which is about 45°. In other experiments, the probing angle ranged from 30 to 70 degrees, with a mean of 50 degrees. The identified angles can be used for probing angle compensation discussed in the following section.

Figure 19A:
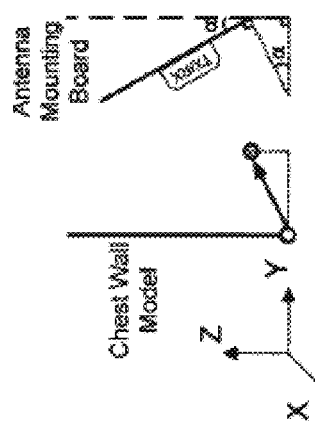
FIG. 19A illustrates a probing angle compensation concept where the transmitting and receiving (TX/RX) antennas are attached to a rigid mounting board with tilted angle that equals to respiratory angle (right).
Figure 19C:
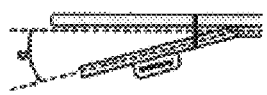
FIG. 19C illustrates a probing angle is equal to respiratory angle in comparison setting.
Figure 19B:
FIG. 19B illustrates a probing angle is zero in the reference setting.

To compensate the respiratory angle for enhancing measurement accuracy of chest wall displacement using Doppler radar, the method of probing angle compensation is proposed. Instead of shining radio wave perpendicularly to the frontal plane of human subject, the transmitting signal's probing direction is adjusted with an angle. FIG. 19(*a*) illustrates the transmitting and receiving (TX/RX) antennas are attached to a rigid board, which is tilted by the respiratory angle estimated. In some embodiments, the respiratory angle is predetermined. In other embodiments, the respiratory angle can be dynamically adjusted. FIGS. 19(*b*) and 19(*c*) gives a comparison of probing angle between the original setting and compensated setting. Due to the fact that the angle between marker trace and y axis is identical to the tilting angle, the compensated probing direction will be at line-of-sight to the chest wall.

In reference test, the TX/RX antennas are attached to a board perpendicular to the floor. In comparison test, the same components were moved upward by 23 inches on a separate board with a tilting angle of 45°. In both tests, subject is asked to breathe normally while sitting on a chair with upright support and maintain stable. The performances of the two settings are compared by examining the linearly demodulated quadrature outputs.

Figure 20A:
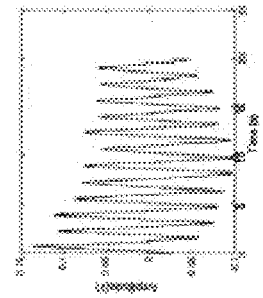
FIG. 20A illustrates performance comparison between reference test and comparison test, where left column plots are with reference test when TX/RX antennas probe at line-of-sight direction to the chest wall, parallel to the floor and right column plots are with comparison test with TX/RX antennas probing at compensation angle, which equals to respiratory angle of the subject under test.
Figure 20A:
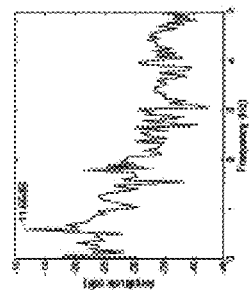
Figure 20B:
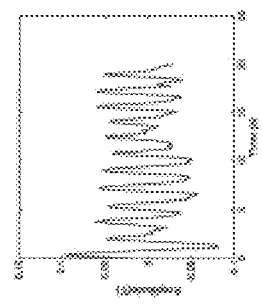
FIG. 20B illustrates performance comparison between reference test and comparison test where left column plots are with reference test when TX/RX antennas probe at line-of-sight direction to the chest wall, parallel to the floor and right column plots are with comparison test with TX/RX antennas probing at compensation angle, which equals to respiratory angle of the subject under test.
Figure 20B:
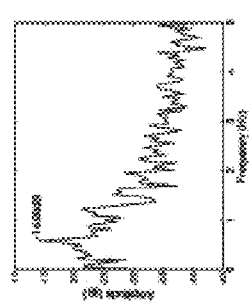

FIGS. 20A and 20B illustrate collection of time domain and frequency domain data of linearly demodulated I/Q signals in both tests. Through the same signal conditioning by FIR filter and linear demodulation, time domain demodulated signals of reference test (left) and comparison test (right) are plotted in FIG. 20(*a*). FIG. 20(*b*) shows that both tests yield valid respiratory rate in frequency domain, while the amplitude of fundamental frequency is about 2.5 dB higher at probing angle. Frequency domain comparison demonstrates better SNR in comparison test.

Accurate assessment of the characteristics of chest wall mechanics can be important in Doppler radar vital sign extraction from human body. By adjusting the angle of transmission, the sensor 10 can compensate the respiratory angle associated to anterior-posterior motion of the thoracic wall. Measurement results on IQ baseband signals indicate that probing angle compensation method improves the peak amplitude of the detectable fundamental frequency, which may alleviate the difficulty of data analysis. It can be applied to improve accuracy of vital sign measurement and occupancy detection in Doppler radar physiological monitoring.

Figure 21:
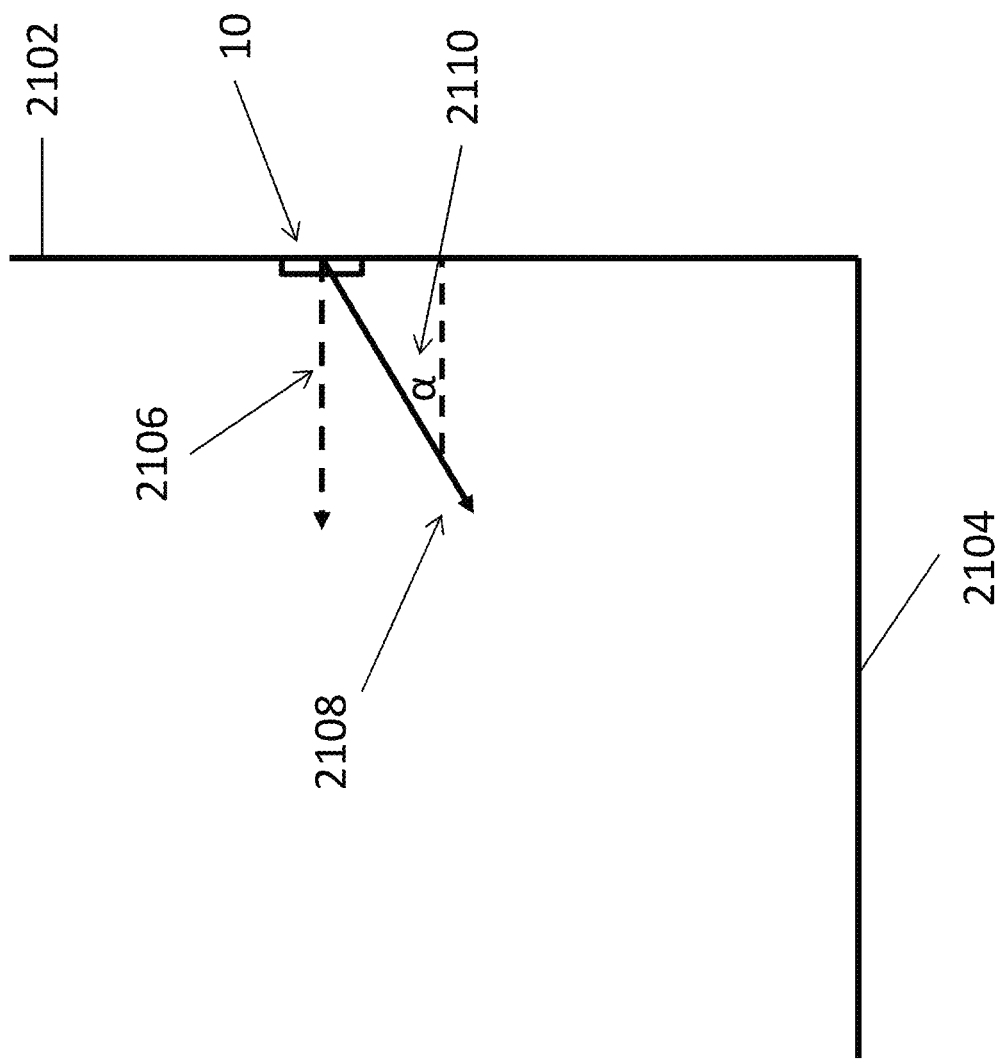
FIG. 21 illustrates a sensor, according to an embodiment of the present disclosure, mounted on a wall in a room.

FIG. 21 illustrates a sensor 10 mounted on a wall 2102 in a room. For the purposes of illustrations, the room wall 2102 is substantially perpendicular to room floor 2104. The room can be any area of coverage with a wall and a floor. In some embodiments, the sensor 10 is placed on a flat surface instead of mounted on the wall 2102. The axis 2106 is substantially parallel to the floor 2104 of the room and substantially perpendicular to the wall 2102 of the room. As discussed above, in some embodiments, the transmitter 12 is mounted in the sensor 10 such that the direction of transmission 2108 is at an angle 2110 from the axis 2106. The angle 2110 can be greater than 5, 10, 15, 20, 30, 45, or 60 degrees. In an embodiment, the angle is substantially 45 degrees. In other embodiments, the angle is substantially 30 degrees or 50 degrees. In some embodiments, the receiver 14 can also be oriented to receive radiation at an angle. In an embodiment, the height from the floor is approximately 5 feet.

Figure 22:
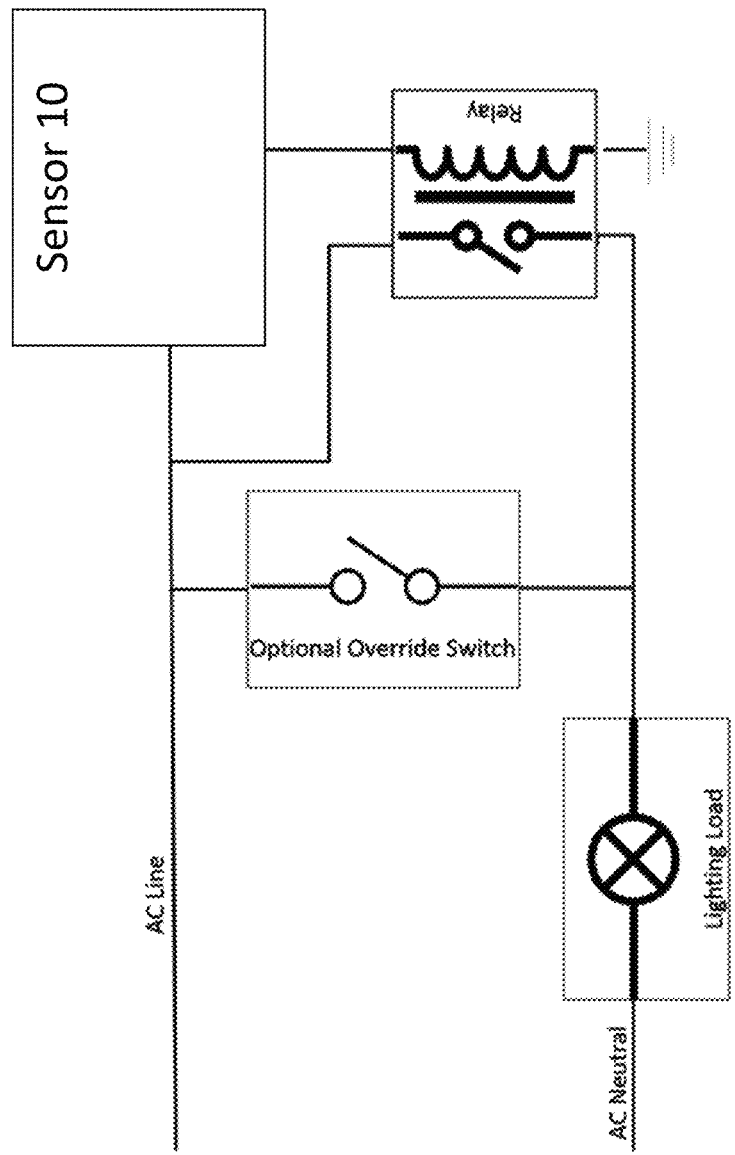
FIG. 22 illustrates an electronic circuit including an occupancy sensor according to an embodiment of the present disclosure.
Figure 23:
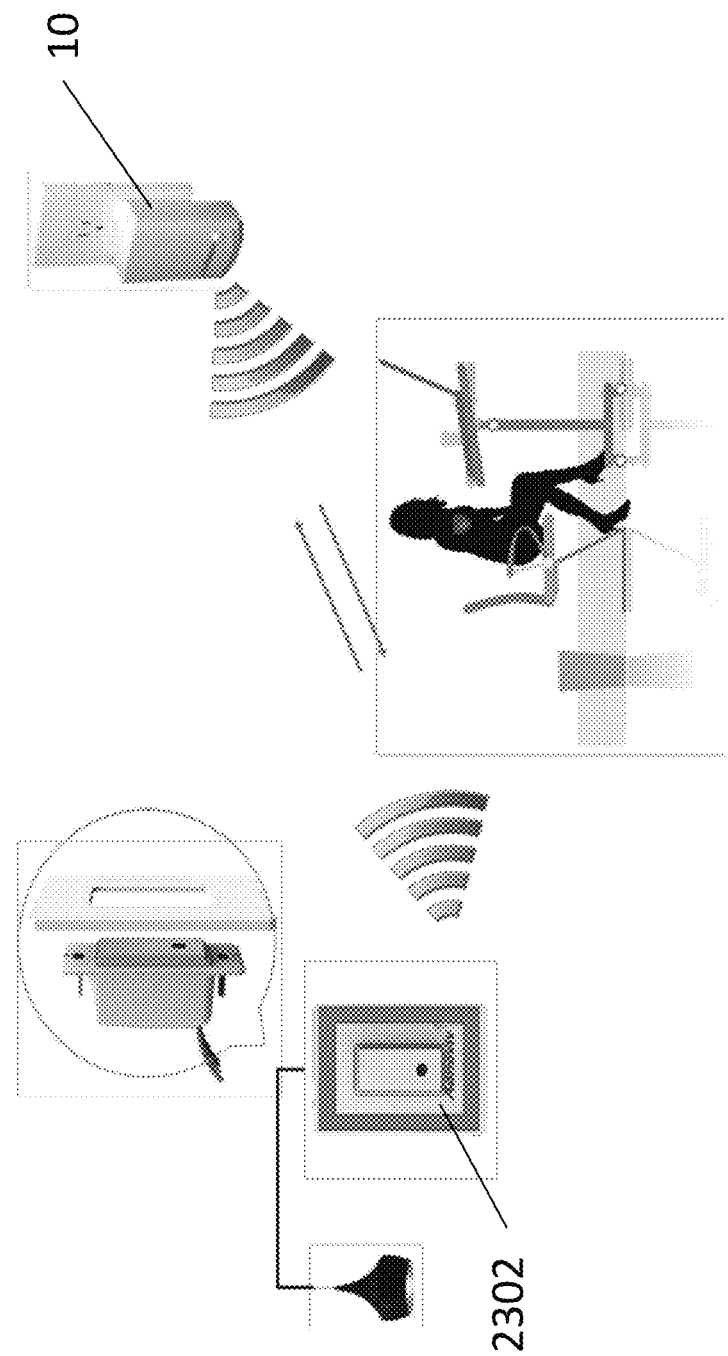
FIG. 23 illustrates a wireless configuration of an occupancy sensor according to an embodiment of the present disclosure.

FIG. 22 illustrates an electronic circuit including an occupancy sensor 10 as discussed above. The electronic circuit also includes a relay or a switch that can control a light source or an electronic load. The ODS 100 can use any of the processes discussed above to detect occupancy. For example, the ODS 100 can use the processes or algorithms described above to extract time domain features from the signal, such as moving average, envelope, pulse shape or the like. Based on these time domain features, the ODS 100 can determine occupancy as discussed in detail above. In some embodiments, the ODS 100 can also extract frequency domain features from the received signals. The frequency domain features can include features corresponding to physiological processes, such as cardiopulmonary processes. The frequency domain features can also include features corresponding to periodic noises in an area of coverage. In some embodiments, the ODS 100 can also extract frequency features from the harmonic frequencies corresponding to base frequencies of physiological frequencies as discussed above. Based on the detection of occupancy, the ODS 100 can send a signal to the relay to control the lights. In some embodiments, the occupancy sensor 10 can communicate wirelessly to a switch as shown in FIG. 23.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Reference to any cited art in this specification is not, and should not be taken as, an acknowledgement or any form of suggestion that prior cited art forms part of the common general knowledge in the field of endeavor in any country in the world.

The disclosed apparatus and systems may also be said broadly to consist in the parts, elements and features referred to or indicated in the specification of the application, individually or collectively, in any or all combinations of two or more of said parts, elements or features.

Where, in the foregoing description reference has been made to integers or components having known equivalents thereof, those integers are herein incorporated as if individually set forth.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

It should be noted that various changes and modifications to the presently preferred embodiments described herein will be apparent to those skilled in the art. Such changes and modifications may be made without departing from the spirit and scope of the disclosed apparatus and systems and without diminishing its attendant advantages. For instance, various components may be repositioned as desired. It is therefore intended that such changes and modifications be included within the scope of the disclosed apparatus and systems. Moreover, not all of the features, aspects and advantages are necessarily required to practice the disclosed apparatus and systems. Accordingly, the scope of the disclosed apparatus and systems is intended to be defined only by the claims that follow.

What is claimed is:

1. A sensor configured to detect a presence of a person in an area of coverage using wireless network compatible radio signals and control a building element, said sensor secured to a wall or ceiling, the sensor comprising:
   a mounting board configured to secure a transmitter, said transmitter configured to transmit wireless network compatible radio signals in the area of coverage, said mounting board positioned at an angle with respect to the wall, wherein the angle is greater than 0, thereby tilting the transmitter and the transmission of the radio signals away from an axis that is normal to a surface of the wall or ceiling;
   a receiver configured to receive the transmitted radio signals that are reflected back from the area of coverage, demodulate the reflected radio signals, and output a baseband signal that includes a Doppler shift from the radio signal;
   a signal conditioning circuit including an analog filter configured to remove noise in the baseband signal;
   a digitizing circuit configured to digitize the analog filtered baseband signal; and
   one or more hardware processors configured to:
      filter the digitized baseband signal to remove frequency components in the baseband signal that are not in a frequency of interest, said frequency of interest including a range of frequencies corresponding to heartbeat or respiration of humans and their harmonics;
      determine, in time domain, a moving average of an amplitude in the filtered signal over a time window;
      compare the moving average to a first threshold;
      detect a presence of a person in the area of coverage based on the comparison;
      control the building element based on the detection of the presence of the person, wherein the building element comprises a lighting system or a HVAC system.

2. The sensor of claim 1, wherein the one or more hardware processors are further configured to:
   extract a first rate of a physiological parameter from a first frequency range of a frequency transform of the digitally filtered signal;
   wherein the control of the building element is further based on the extracted first rate of the physiological parameter.

3. The sensor of claim 2, wherein the one or more hardware processors are further configured to:
   determine a ratio in a time period that the moving average is greater than the first threshold; and
   wherein the control of the building element is further based on the determined ratio.

4. The sensor of claim 2, wherein the one or more hardware processors are further configured to:
   extract a second rate of a physiological parameter from a second frequency range of the frequency transform of the digitally filtered signal, the second frequency range corresponding to a harmonic of the first frequency range;
   wherein the control of the building element is further based on the extracted second rate.

5. The sensor of claim 1, wherein the one or more hardware processors are further configured to:eb;normal
   receive an indication from an infrared sensor; and control the transmitter based on the received indication from the infrared sensor.

6. The sensor of claim 1, wherein the angle is substantially 45 degrees.

7. The sensor of claim 1, further comprising an antenna.

8. The sensor of claim 7, wherein the antenna is shared by the transmitter and the receiver.

9. The sensor of claim 7, wherein the mounting board is secured to a sensor chassis.

10. The sensor of claim 1, wherein the transmission is not in a plane parallel to the floor.

11. The sensor of claim 1, wherein the transmission is not substantially perpendicular to a surface parallel to the wall or ceiling.

12. The sensor of claim 1, further comprising an infrared sensor configured to detect motion.

13. A method for detecting a presence of a person in an area of coverage using wireless network radio signals and controlling a building element, said sensor secured to a wall or ceiling, the method comprising:
   transmitting a wireless network radio signals in an area of coverage, wherein the transmission of the radio signals is fixed at an angle away from an axis that is normal to a surface of the wall or ceiling;
   receiving the transmitted radio signals that are reflected back from the area of coverage;
   demodulating the reflected radio signals;
   outputting a baseband signal that includes a Doppler shift from the radio signal;
   filtering noise from the baseband signal;
   digitizing the filtered baseband signal;
   filtering the digitized baseband signal to remove frequency components in the baseband signal that are not in the frequency of interest, said frequency of interest including a range of frequencies corresponding to heartbeat or respiration of humans and their harmonics;
   extracting a time domain feature from the filtered digitized signal;
   extracting frequency domain features from the filtered digitized signal, said frequency domain features comprise a first peak in a first frequency range corresponding to a physiological rate and a second peak in a second frequency range corresponding to a harmonic of the physiological rate;
   detecting a presence of a person in an area of coverage based on the extracted time domain feature and the frequency domain features; and
   controlling the building element based on the detection of the presence of the person, wherein the building element comprises a lighting system or a HVAC system.

14. The method of claim 13, wherein the time domain feature comprises an average measurement of an amplitude of the signal.

15. The sensor of claim 1, wherein the wireless network compatible radio signals comprise a wireless personal area network or a wireless local area network generated from a system on a chip.

16. The sensor of claim 4, wherein the one or more hardware processors are further configured to determine a ratio of a first power in the first frequency range to a second power in the second frequency range, and wherein the control of the building element is further based on the determined ratio.

17. The method of claim 13, wherein the wireless network compatible radio signals comprise a wireless personal area network or a wireless local area network generated from a system on a chip.

* * * * *